(12) United States Patent
Everest

(10) Patent No.: US 12,307,339 B2
(45) Date of Patent: May 20, 2025

(54) APPARATUS AND METHODS FOR TRAINING AN EDUCATIONAL MACHINE-LEARNING MODEL

(71) Applicant: edYou, Los Angeles, CA (US)

(72) Inventor: Michael Everest, Los Angeles, CA (US)

(*) Notice: Subject to any disclaimer, the term of this patent is extended or adjusted under 35 U.S.C. 154(b) by 0 days.

(21) Appl. No.: 18/423,991

(22) Filed: Jan. 26, 2024

(65) Prior Publication Data

US 2024/0311688 A1    Sep. 19, 2024

Related U.S. Application Data

(63) Continuation of application No. 18/122,366, filed on Mar. 16, 2023, now Pat. No. 11,893,464.

(51) Int. Cl.
    *G06N 20/00*      (2019.01)
    *G06F 21/31*      (2013.01)

(52) U.S. Cl.
    CPC ............. *G06N 20/00* (2019.01); *G06F 21/31* (2013.01)

(58) Field of Classification Search
    CPC ................................ G06N 20/00; G06F 21/31
    See application file for complete search history.

(56) References Cited

U.S. PATENT DOCUMENTS

| | | | |
|---|---|---|---|
| 6,135,776 A | 10/2000 | Ertuck et al. | |
| 9,421,455 B1 | 8/2016 | Connor et al. | |
| 10,311,645 B1 | 6/2019 | Ravindran et al. | |
| 10,453,165 B1 | 10/2019 | Kostov et al. | |
| 10,757,132 B1 | 8/2020 | Powers et al. | |
| 10,764,272 B1 | 9/2020 | Manwiller et al. | |
| 10,872,152 B1 | 12/2020 | Martel et al. | |
| 11,043,026 B1 | 6/2021 | Fathi | |
| 11,100,448 B1 * | 8/2021 | Plazola | G06F 21/53 |
| 11,108,714 B1 * | 8/2021 | Shetty | H04L 51/046 |
| 11,176,484 B1 * | 11/2021 | Dorner | G06F 16/738 |
| 11,188,915 B2 | 11/2021 | Phillips et al. | |
| 11,468,275 B1 | 10/2022 | Blechschmidt et al. | |
| 11,546,657 B1 | 1/2023 | O'Pray et al. | |
| 11,683,174 B1 | 6/2023 | Stewart et al. | |

(Continued)

FOREIGN PATENT DOCUMENTS

| | | |
|---|---|---|
| CN | 113592251 | 7/2021 |
| CN | 114550545 | 2/2022 |
| CN | 114550545 A | 5/2022 |

*Primary Examiner* — Aravind K Moorthy
(74) *Attorney, Agent, or Firm* — Caldwell Intellectual Property Law

(57) ABSTRACT

An apparatus and methods for training an educational machine-learning model, the apparatus includes a sensory device configured to capture an external datum pertaining to a user, at least a processor in communication with the sensory device, and a memory containing instructions configuring the at least a processor to receive the user data, wherein the user data includes the external datum captured by the sensory device, and a user input accepted through a visual interface, authenticate the user as a function of the external datum using a user authentication module, generate educational training data as a function of the user data, train an educational machine-learning model using the educational training data, and determine a user input modifier as a function of the trained educational machine-learning model.

20 Claims, 9 Drawing Sheets

(56) References Cited

U.S. PATENT DOCUMENTS

| | | | |
|---|---|---|---|
| 11,762,457 B1* | 9/2023 | Ikkai | G06V 40/174 |
| | | | 345/156 |
| 11,893,464 B1* | 2/2024 | Everest | G06F 21/31 |
| 11,894,941 B1* | 2/2024 | Raheja | G06V 10/764 |
| 11,954,443 B1* | 4/2024 | Kumar | G06N 20/00 |
| 12,008,579 B1* | 6/2024 | Kumar | G06Q 30/016 |
| 2005/0003330 A1* | 1/2005 | Asgarinejad | G09B 7/02 |
| | | | 434/20 |
| 2005/0021202 A1 | 1/2005 | Russell et al. | |
| 2005/0221266 A1 | 10/2005 | Mislevy et al. | |
| 2006/0073461 A1 | 4/2006 | Gillaspy et al. | |
| 2008/0010068 A1 | 1/2008 | Seita | |
| 2008/0038708 A1 | 2/2008 | Slivka et al. | |
| 2009/0135002 A1 | 5/2009 | Blinnikka et al. | |
| 2009/0222657 A1* | 9/2009 | Bender | H04W 12/069 |
| | | | 713/156 |
| 2011/0263946 A1* | 10/2011 | el Kaliouby | A61B 5/16 |
| | | | 600/300 |
| 2012/0109676 A1 | 5/2012 | Landau | |
| 2013/0278552 A1 | 10/2013 | Kamin-Lyndgaard | |
| 2014/0065594 A1 | 3/2014 | Venable | |
| 2015/0133830 A1 | 5/2015 | Dirks et al. | |
| 2015/0186780 A1 | 7/2015 | Zhang et al. | |
| 2015/0302755 A1 | 10/2015 | Breck et al. | |
| 2016/0163332 A1* | 6/2016 | Un | G10L 25/63 |
| | | | 704/260 |
| 2016/0232368 A1* | 8/2016 | Clark | G06F 16/367 |
| 2017/0076565 A1* | 3/2017 | Saboune | G06F 3/016 |
| 2017/0126630 A1* | 5/2017 | Ekambaram | H04L 63/102 |
| 2017/0132290 A1* | 5/2017 | Koch | G06N 3/08 |
| 2017/0147837 A1 | 5/2017 | Kovacs | |
| 2018/0075162 A1* | 3/2018 | Ni | G06F 16/24578 |
| 2018/0114125 A1* | 4/2018 | Ichiboshi | A61B 5/0077 |
| 2018/0232050 A1* | 8/2018 | Ofek | G06T 3/18 |
| 2018/0233059 A1 | 8/2018 | Batteson et al. | |
| 2018/0335756 A1 | 11/2018 | Kim | |
| 2018/0349416 A1 | 12/2018 | Circlaeys et al. | |
| 2019/0005313 A1* | 1/2019 | Vemulapalli | G06V 10/454 |
| 2019/0158477 A1 | 5/2019 | Nagaratnam et al. | |
| 2019/0208412 A1* | 7/2019 | Lord | H04W 12/30 |
| 2019/0268668 A1* | 8/2019 | Moskovchenko | |
| | | | H04N 21/2187 |
| 2019/0286938 A1 | 9/2019 | Backhus et al. | |
| 2019/0290172 A1 | 9/2019 | Hadad et al. | |
| 2020/0005083 A1 | 1/2020 | Collins | |
| 2020/0090002 A1* | 3/2020 | Zhu | G06N 3/047 |
| 2020/0105009 A1 | 4/2020 | Eno et al. | |
| 2020/0134296 A1* | 4/2020 | Rajvanshi | G06V 10/82 |
| 2020/0152328 A1 | 5/2020 | Bender et al. | |
| 2020/0159724 A1 | 5/2020 | Nguyen | |
| 2020/0193206 A1 | 6/2020 | Turkelson et al. | |
| 2020/0202737 A1 | 6/2020 | Aiyer | |
| 2020/0234181 A1* | 7/2020 | Katz | G06N 20/00 |
| 2020/0234502 A1 | 7/2020 | Anderlecht | |
| 2020/0272810 A1 | 8/2020 | Asa et al. | |
| 2020/0349429 A1* | 11/2020 | Vendrow | H04N 7/15 |
| 2020/0349617 A1 | 11/2020 | Rosas-Maxemin et al. | |
| 2020/0364457 A1* | 11/2020 | Wang | G06F 18/214 |
| 2020/0372162 A1 | 11/2020 | Kinai et al. | |
| 2020/0381117 A1* | 12/2020 | Spenciner | A61B 5/165 |
| 2021/0081841 A1 | 3/2021 | Sikka et al. | |
| 2021/0096646 A1* | 4/2021 | Yildiz | G06F 3/012 |
| 2021/0133600 A1 | 5/2021 | Elewitz et al. | |
| 2021/0142103 A1* | 5/2021 | Xie | G06N 5/04 |
| 2021/0142401 A1 | 5/2021 | Flowers et al. | |
| 2021/0149495 A1* | 5/2021 | Shu | G06F 3/014 |
| 2021/0176236 A1 | 6/2021 | Dimitrov et al. | |
| 2021/0191825 A1 | 6/2021 | Chopra et al. | |
| 2021/0224376 A1 | 7/2021 | Gupta et al. | |
| 2021/0248090 A1* | 8/2021 | Martin | G06F 21/44 |
| 2021/0258308 A1 | 8/2021 | Avetisov et al. | |
| 2021/0272554 A1* | 9/2021 | Robert Jose | G10L 15/26 |
| 2021/0279852 A1 | 9/2021 | Jakka et al. | |
| 2021/0291839 A1* | 9/2021 | Hutchings | A61B 5/18 |
| 2021/0303845 A1 | 9/2021 | Woo et al. | |
| 2021/0319090 A1 | 10/2021 | Demir et al. | |
| 2021/0319306 A1* | 10/2021 | Leite Pinheiro de Paiva | |
| | | | G06F 16/957 |
| 2021/0319420 A1 | 11/2021 | Yu et al. | |
| 2021/0374226 A1 | 12/2021 | Mondello et al. | |
| 2021/0374353 A1* | 12/2021 | Zhang | G06F 40/30 |
| 2021/0374456 A1 | 12/2021 | Umakanth et al. | |
| 2021/0374797 A1 | 12/2021 | Hasan | |
| 2021/0375148 A1* | 12/2021 | Kairinos | G06N 5/022 |
| 2022/0004809 A1* | 1/2022 | Iyer | G06F 18/40 |
| 2022/0067642 A1 | 3/2022 | Barton et al. | |
| 2022/0076164 A1 | 3/2022 | Connort et al. | |
| 2022/0082474 A1 | 3/2022 | Cintas et al. | |
| 2022/0084034 A1 | 3/2022 | Lu et al. | |
| 2022/0189502 A1* | 6/2022 | Alemu | G10L 25/63 |
| 2022/0200934 A1* | 6/2022 | Dutta | G06N 3/047 |
| 2022/0222926 A1 | 6/2022 | Gladisch et al. | |
| 2022/0237908 A1 | 6/2022 | Yang et al. | |
| 2022/0215285 A1* | 7/2022 | Daly | G06N 5/027 |
| 2022/0224693 A1* | 7/2022 | Broadworth | H04L 63/101 |
| 2022/0230418 A1 | 7/2022 | Gladisch et al. | |
| 2022/0245558 A1* | 8/2022 | Kuroda | G06Q 10/06398 |
| 2022/0292261 A1* | 9/2022 | Movshovitz-Attias | |
| | | | G06N 20/00 |
| 2022/0398411 A1* | 12/2022 | Cowen | G06F 18/41 |
| 2022/0417194 A1* | 12/2022 | Prabhu | G06F 3/04842 |
| 2023/0046286 A1* | 2/2023 | Tay | G06V 10/242 |
| 2023/0049225 A1* | 2/2023 | Sawano | G10L 25/63 |
| 2023/0071947 A1* | 3/2023 | Miyamoto | G06T 11/00 |
| 2023/0095088 A1* | 3/2023 | Ando | G10L 25/30 |
| | | | 704/200 |
| 2023/0133057 A1 | 5/2023 | Murthy | |
| 2023/0141104 A1* | 5/2023 | Alluri | G06F 16/68 |
| | | | 707/769 |
| 2023/0153641 A1 | 5/2023 | Manda et al. | |
| 2023/0196567 A1 | 6/2023 | Aykut et al. | |
| 2023/0197106 A1* | 6/2023 | Alisamir | G10L 15/08 |
| | | | 704/235 |
| 2023/0206214 A1 | 6/2023 | Meikle | |
| 2023/0215283 A1 | 7/2023 | Sha et al. | |
| 2023/0238019 A1* | 7/2023 | Lisic | G10L 25/30 |
| | | | 600/586 |
| 2023/0263440 A1* | 8/2023 | Tan | G16H 50/30 |
| | | | 600/301 |
| 2023/0306504 A1* | 9/2023 | Liila | G06Q 40/02 |
| 2023/0307115 A1* | 9/2023 | Kumar | G06F 40/30 |
| 2023/0309882 A1* | 10/2023 | Ye | A61B 5/0077 |
| | | | 600/301 |
| 2023/0317246 A1* | 10/2023 | Dhillon | A61B 5/4803 |
| | | | 705/2 |
| 2023/0368571 A1* | 11/2023 | Zhang | G06V 40/166 |
| 2023/0386642 A1* | 11/2023 | Foufa | G10L 25/63 |
| 2023/0412530 A1* | 12/2023 | Schuetz | G06N 3/045 |
| 2024/0015262 A1* | 1/2024 | Zavesky | G09B 5/06 |
| 2024/0028110 A1* | 1/2024 | Aurongzeb | H04R 1/1008 |
| 2024/0105074 A1* | 3/2024 | Harishankar | G06N 20/00 |
| 2024/0169711 A1* | 5/2024 | Choudhary | G06V 10/806 |
| 2024/0363222 A1* | 10/2024 | Neumann | G16H 10/20 |

\* cited by examiner

APPARATUS AND METHODS FOR TRAINING AN EDUCATIONAL MACHINE-LEARNING MODEL

CROSS-REFERENCE TO RELATED APPLICATIONS

This application is a continuation of Non-provisional application Ser. No. 18/122,366 filed on Mar. 16, 2023, and entitled "APPARATUS AND METHODS FOR TRAINING AN EDUCATIONAL MACHINE-LEARNING MODEL," the entirety of which is incorporated herein by reference.

FIELD OF THE INVENTION

The present invention generally relates to the field of artificial intelligence. In particular, the present invention is directed to an apparatus and methods for training an educational machine-learning model.

BACKGROUND

Currently there are over 17 million online education learners in the United States, however, online education systems lack personalization and interaction with learners often finding it difficult to focus. An effective online education system remains an elusive goal.

SUMMARY OF THE DISCLOSURE

In an aspect, an apparatus for training an educational machine-learning model is described. The apparatus includes a sensory device configured to capture an external datum pertaining to a user, at least a processor in communication with the sensory device, and a memory communicatively connected to the at least a processor, wherein the memory contains instructions configuring the at least a processor to receive the user data, wherein the user data includes the external datum captured by the sensory device, and wherein a computer vision model is utilized to detect a user implication identifier based on the external datum, and authenticate the user as a function of the external datum using a user authentication module. The processor is further configured to generate educational training data as a function of the user data, wherein the educational training data includes user implication identifiers. Further, the processor is configured to train an educational machine-learning model using the educational training data determine a user input modifier as a function of the trained educational machine-learning model.

In another aspect, a method for training an educational machine-learning model is described. The method includes receiving, by at least a processor, user data pertaining to a user, wherein the user data includes an external datum captured by a sensory device in communication with the at least a processor, wherein a computer vision model is utilized to detect a user implication identifier based on the external datum. The method includes authenticating the user as a function of the external datum using a user authentication module and generating educational training data as a function of the user data, wherein the educational training data includes user implication identifiers. Further, the method may include training an educational machine-learning model using the educational training data and determining a user input modifier as a function of the trained educational machine-learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for training an educational machine-learning model. In an embodiment, apparatus is configured to receive user data pertaining to a user, wherein the user data includes an external datum captured by a sensory device, and a user input accepted through a visual interface.

Aspects of the present disclosure can be used to authenticate the user as a function of the external datum pertaining to the user. Aspects of the present disclosure can also be used to generate educational training data as a function of the user data pertaining to the user. This is so, at least in part, because apparatus includes a user authentication module, wherein the user authentication module may include a computer vision model configured to process the external datum pertaining to the user.

Aspects of the present disclosure allow for determining a user input modifier as a function of an educational machine-learning model trained using the educational training data. Exemplary embodiments illustrating aspects of the present disclosure are described below in the context of several specific examples.

Figure 1:
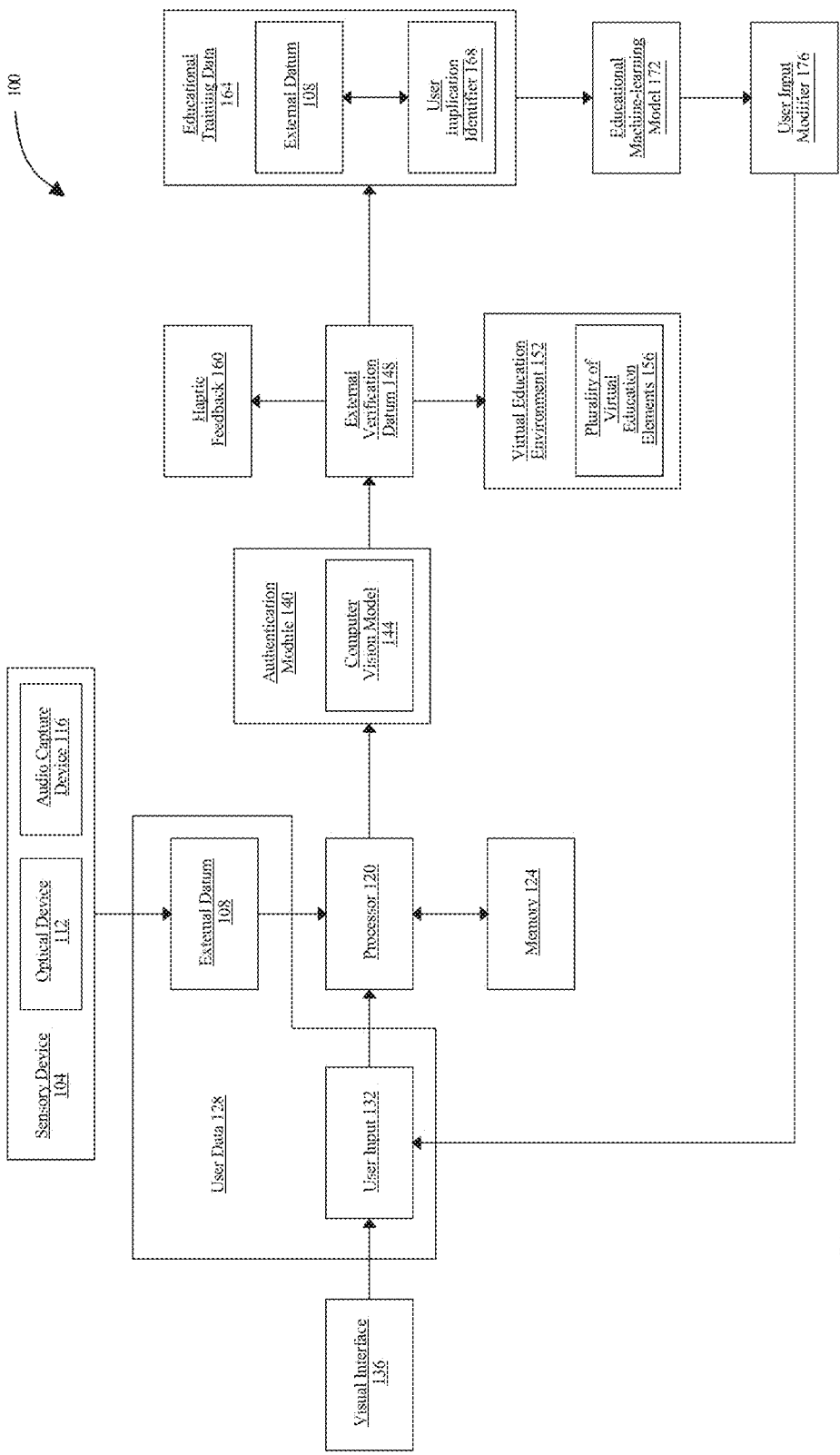
FIG. 1 is an exemplary embodiment of an apparatus for training an educational machine-learning model.

Referring now to FIG. 1, an exemplary embodiment of an apparatus 100 for training an educational machine-learning model is illustrated. Apparatus includes a sensory device 104 configured to capture external datum 108 pertaining to a user. User may include, without limitation, any individual or groups of individuals use, operate, or otherwise utilize apparatus 100 described in this disclosure. In a non-limiting example, user may include a student in academia who is currently performing any processing steps and/or utilizing any data or elements produced by performance of one or more processing steps described in this disclosure using apparatus 100. As used in this disclosure, a "sensory device" is a device that performs detection, measurement, processing, and/or otherwise simulation of user's external datum as described in further detail below; for instance, and without limitation, external datum 108 pertaining to the user. In some embodiments, sensory device 104 may be disposed near the user, or within a certain range around the user. In a non-limiting example, sensory device 104 may be remote to apparatus 100 and close to the user in order to capture external datum 108 pertaining to the user. An "external datum" is an element of data related to an exterior representation of the user, wherein the exterior representation is concerned with external referential aspects of the user such as, without limitation, appearance, physical characteristics, movements, and the like thereof. In some embodiments, external datum 108 may include data related to user's visual representation. In a non-limiting example, external datum 108 may include data related to user's facial motions, facial expressions, eye tracking, wherein eye tracking may include movement of the eye and/or blinks of an eye, user's movement including user's head movement, hand movement, body movement, and/or the like, physical environment surrounding the user, and the like thereof. In other embodiments, external datum 108 may include user's auditory representation. In a non-limiting example, external datum 108 may further include data related to user's voice, intonation of user's voice, environmental sounds, background noise, and the like thereof.

With continued reference to FIG. 1, sensory device 104 may include an optical device 112. As used in this disclosure, an "optical device" is a device that is configured to sense electromagnetic radiation, such as without limitation visible light, and generate an image representing the electromagnetic radiation. In some cases, optical device may include a camera, wherein the camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. In a non-limiting example, optical device 112 may include any device configured to capture visual representation of the user, or the environment surrounding user, from a portable webcam to a high-end camera configured to capture visual representations not visible to human eye, such as, without limitation, infra-red cameras. As used in this disclosure, "image data" is information representing at least a physical scene, space, and/or object. In some cases, external datum 108 may include image data, generated by camera, related to the user. "Image data" may be used interchangeably through this disclosure with "image," where image is used as a noun. An image may be optical, such as without limitation where at least an optic is used to generate an image of an object. In a non-limiting example, optical device 104 may be configured to user at least an optic to generate an image of the user. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image. In other cases, external datum 108 may include video data related to the user, wherein video data is a recording of plurality of images generated by at least an optic.

With continued reference to FIG. 1, in some embodiments, sensory device 104 may include an eye sensor. As used in this disclosure, an "eye sensor" is any system or device that is configured or adapted to detect an eye parameter as a function of an eye phenomenon. In some cases, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In some cases, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. In a non-limiting example, eye sensor may include an electromyography sensor. Electromyography sensor may be configured to detect at least an eye parameter as a function of at least an eye phenomenon.

Still referring to FIG. 1, in some embodiments, eye sensor may be embedded within optical device 112 described above. In a non-limiting example, eye sensor may utilize a camera directed toward user's eyes. In some cases, eye sensor may include a light source, likewise directed to user's eyes. Light source may have a non-visible wavelength, for instance infrared or near-infrared. In some cases, a wavelength may be selected which reflects at an eye's pupil (e.g., infrared). Light that selectively reflects at an eye's pupil may be detected, for instance by camera. Images of eyes may be captured by camera of optical device 112. In some embodiments, optical device 112 may be programmed with Python using a Remote Python/Procedure Call (RPC) library. Optical device 112 may be used to operate computer vision model described below in this disclosure; for instance, and without limitation, optical device 112 may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video.

Still referring to FIG. 1, in some cases, optical device 112 with eye sensor may be used to determine eye patterns (e.g., track eye movements). For instance, and without limitation, camera of optical device 112 may capture one or more images of the user and internal/external processor of optical device 112 may process images to track user's eye movements. External processor may include a processor in communication with sensory device 104 as described in further detail below. In some embodiments, a video-based eye tracker may use corneal reflection (e.g., first Purkinje image) and a center of pupil as features to track over time. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In some cases, optical methods, particularly those based on video recording, may be used for gaze-tracking and may be non-invasive and inexpensive. In a non-limiting example, a relative position between camera of optical device 112 and the user may be known or estimable. Pupil location may be determined through analysis of images (either visible or infrared images). In some cases, camera may focus on one or both eyes and record eye movement as viewer (i.e., user) looks. In some cases, eye sensor embedded within optical device 112 may use center of pupil and infrared/near-infrared non-collimated light to create corneal reflections (CR). A vector between pupil center and corneal reflections can be used to compute a point of regard on surface (i.e., a gaze direction). In some cases, a simple calibration procedure with the user may be needed before using eye sensor. In some cases, two general types of infrared/near-infrared (also known as active light) eye-tracking techniques can be used: bright-pupil (light reflected by pupil) and dark-pupil (light not reflected by pupil). Difference between bright-pupil and dark pupil images may be based on a location of illumination source with respect to optics. For instance, if illumination is coaxial with optical path, then eye may act as a retroreflector as the light reflects off retina creating a bright pupil effect similar to red eye. If illumination source is offset from optical path, then pupil may appear dark because reflection from retina is directed away from camera. In some cases, bright-pupil tracking creates greater iris/pupil contrast, allowing more robust eye-tracking with all iris pigmentation, and greatly reduces interference caused by eyelashes and other obscuring features. In some cases, bright-pupil tracking may also allow tracking in lighting conditions ranging from total darkness to very bright.

Still referring to FIG. 1, additionally, or alternatively, in some cases, a passive light optical eye tracking method may be employed by optical device 112. Passive light optical eye tracking may use visible light to illuminate user's eyes. In some cases, passive light optical tracking yields less contrast of pupil than with active light methods; therefore, in some cases, a center of iris may be used for calculating a gaze vector. In some cases, a center of iris determination requires detection of a boundary of iris and sclera (e.g., limbus tracking). In some case, eyelid obstruction of iris and our sclera may challenge calculations of an iris center. Further, sensory device 104 may be head-mounted, some may require user's head to be stable, and some may function remotely and automatically track user's head during motion. Optical device 112 of sensory device 104 may capture images at frame rate. Exemplary frame rates include 15, 30, 60, 120, 240, 350, 1000, and 1250 Hz.

With continued reference to FIG. 1, sensory device 104 may further include an audio capture device 116. As used in this disclosure, an "audio capture device" is a device that is configured to convert auditory data, such as, without limitation, an audio into a stream of discrete numbers representing the changes over time in air pressure for the audio. In some embodiments, audio capture device 116 may include a microphone. As used in this disclosure, a "microphone" is any transducer configured to transduce pressure change phenomenon to a signal, for instance a signal representative of a parameter associated with the phenomenon. Microphone, according to some embodiments, may include a transducer configured to convert sound into electrical signal. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). Microphone may include any microphone for transducing pressure changes, as described above; therefore, microphone may include any variety of microphone such as, without limitation, condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone. In some embodiments, audio capture device may include a match of analog-to-digital converter (ADC) and digital-to-analog converter (DAC), wherein the match of ADC and DAC may reconstruct analog signal from the stream of discrete numbers. In a non-limiting example, audio capture device 116 may include a microphone configured to capture user's auditory representation as described above, including frequencies outside human's auditory capability. Audio capture device 116 be configured to convert captured auditory representation into audio signal as described in further detail below via ADC. Additionally, or alternatively, microphone of audio capture device 116 may be configured to transduce an environmental noise to an environmental noise signal. In some cases, environmental noise may include any of background noise, ambient noise, aural noise, such as noise heard by a user's car, and the like. Additionally, or alternatively, in some embodiments, environmental noise may include any noise present in an environment, such as without limitation an environment surrounding, proximal to, or of interest/disinterest to a user. Environmental noise may, in some cases, include substantially continuous noises, such as a drone of an engine. Environmental noise signal may include any type of signal, for instance types of signals described in this disclosure. For instance, and without limitation, an environmental noise signal may include a digital signal or an analog signal.

With continued reference to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device, for example by way of an input/output port. An analog signal may be digitized, for example by way of ADC as described above. In some cases, an analog signal may be processed, for example by way of any analog signal processing steps described in further detail below, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, an "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively, or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced.

With continued reference to FIG. 1, sensory device 104 may also include a biological sensor. As used in this disclosure, a "biological sensor" is a sensor device that produces an electrical output signal for purpose of sensing and monitoring biological events or changes of the user. In some cases, biological sensor 108 may include, without limitation, a temperature sensor, EMG sensor, ECG sensor, airflow sensor, glucometer sensor, pressure sensor, magnetic field sensor, and the like thereof. In some embodiments, without limitation, biological sensor may include a biosensor, wherein the biosensor is a device that combines a biological material with a suitable platform for a detection of biomarkers of the user. As used in this disclosure, a "biomarker" is a measurable substance or value in/of an organism (i.e., user) whose presence is indicative of some biological phenomenon such as disease, inflection, environmental exposure, and the like. In some cases, biosensor may include, without limitation, electrochemical biosensor, physical biosensor, optical biosensor, wearable biosensor, and the like thereof. In a non-limiting example, biological sensor may be configured to measure user's biomarkers such as heat rate, body temperature, blood pressure, and the like thereof. Such sensory device 104 including biological sensor may be placed on to the user in a comfortable manner; for instance, and without limitation, sensory device 104 may include a headset worn by the user, joystick/controller held by the user, and/or the like thereof. Additionally, or alternatively, biomarkers may include external biomarkers detected by biological device; for instance, and without limitation, biological device may include a fingerprint reader configured to detect and/or read one or more fingerprints from the user.

With continued reference to FIG. 1, apparatus 100 includes a processor 120 in communication with sensory device 104, and a memory 124 communicatively connected to the processor 102. Processor 120 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 120 may include a single computing device operating independently, or may include two or more computing device operating in concert, in parallel, sequentially or the like; two or more computing devices may be included together in a single computing device or in two or more computing devices. Processor 120 may interface or communicate with one or more additional devices as described below in further detail via a network interface device. Network interface device may be utilized for connecting processor 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 120 may include but is not limited to, for example, a computing device or cluster of computing devices in a first location and a second computing device or cluster of computing devices in a second location. Processor 120 may include one or more computing devices dedicated to data storage, security, distribution of traffic for load balancing, and the like. Processor 120 may distribute one or more computing tasks as described below across a plurality of computing devices of computing device, which may operate in parallel, in series, redundantly, or in any other manner used for distribution of tasks or memory between computing devices. Processor 120 may be implemented using a "shared nothing" architecture in which data is cached at the worker, in an embodiment, this may enable scalability of apparatus 100 and/or computing device.

With continued reference to FIG. 1, processor 120 may be designed and/or configured to perform any method, method step, or sequence of method steps in any embodiment described in this disclosure, in any order and with any degree of repetition. For instance, processor 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 124 includes instructions configuring at least a processor 120 to perform any processing step described in this disclosure. As used in this disclosure, "communicatively connected" means connected by way of a connection, attachment, or linkage between two or more related which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, apparatus 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, processor 120 is configured to receive user data 128. As used in this disclosure, to "receive" means to collect, gather, or otherwise receive data. As used in this disclosure, "user data" is information related to a user. User data 128 includes external datum 108 captured by sensory device 104 as described above. External datum 108 may include any external datum 108 described in this disclosure. In some embodiments, user data 128 may include user metadata. "User metadata" is a set of data that identifies the user. In some embodiments, user metadata may include personal information of the user. In a non-limiting example, personal information may include name, age, gender, address, characteristics of the user and the like. In some embodiments, user metadata may include family information of the user. In a non-limiting example, family information may include information regarding user's parent, siblings, relatives, and the like. In some embodiments, user metadata may include educational information of user. In a non-limiting example, educational information may include user's school, field of study, course schedule, grades, classroom locations, classmates, teachers, and the like. User metadata may include any user data described in U.S. patent application Ser. No. 18/122,340, filed on Mar. 16, 2023, and titled "APPARATUS AND METHOD FOR GENERATING AN EDUCATIONAL ACTION DATUM USING MACHINE-LEARNING," the entity of which is incorporated by reference herein.

With continued reference to FIG. 1, user data 128 further includes a user input 132 accepted through a visual interface 136. As used in this disclosure, a "user input" is any information or data sent to processor 120 from the user. In some embodiments, user input may be sent from a user input device and received by processor 128. "User input device," for the purpose of this disclosure, is a device configured to accept user input 132. User input device may include any additional computing device, such as a mobile device, laptop, desktop computer, or the like. In some embodiments, user input device may include a display in communication with processor 128, where the display may include any display as described herein. In an embodiment, user input device may have a touch screen to interact with the user. User may input user data 128 such as, without limitation, user input 132, through user input device. In a non-limiting example, user input 132 may include a submission of user metadata. In some embodiments, without limitation, user input may be consumed by processor 120 to perform one or more processing steps described in this disclosure. In another non-limiting example, user input 132 may include a plurality of user data items, wherein each user data item of plurality of user data items may include a desired characteristics of a virtual avatar (i.e., attributes, type, appearance, and the like). "Virtual avatar," as used for the purpose of this disclosure, is a virtual representation of the user. Processor 128 may be configured to generate virtual avatar based on such user input 132 using a "virtual avatar model," wherein the virtual avatar model is a component configured to generate virtual avatar associated with the user via a machine-learning model. For instance, and without limitation, virtual avatar, virtual avatar model, and method for generating virtual avatar using virtual avatar model may be consistent with any virtual avatar, virtual avatar model, and methods described in U.S. patent application Ser. No. 18/122,298, filed on Mar. 16, 2023, and titled "APPARATUS AND METHOD FOR EDUCATING AN ENTITY USING EXTENDED REALITY," the entity of which is incorporated by reference herein. In a further non-limiting example, user input 132 may include one or more user response to a user-oriented assignment. A "user-oriented assignment," as described herein, is a set of user-specific questions targeting user's educational difficulties. User responses may include answers to one or more user specific questions defined in user-oriented assignment. User-oriented assignment may be determined and/or generated by processor 128 as a function of user data 128 such as, without limitation, user metadata. For instance, and without limitation, user-oriented assignment and method for generating user-oriented assignment may be consistent with any user-oriented assignment and methods described in U.S. patent application Ser. No. 18/122,340, filed Mar. 16, 2023, and titled "APPARATUS AND METHOD FOR GENERATING AN EDUCATIONAL ACTION DATUM USING MACHINE-LEARNING," the entity of which is incorporated by reference herein.

With continued reference to FIG. 1, as described in this disclosure, a "visual interface" is a graphical user interface (GUI) that displays any data described above to user of a remote device and permits entity to view, edit, or otherwise interact with displayed content. Visual interface 136 may include a window in which data may be displayed. For example, and without limitation, visual interface may be configured to display one or more user-specific questions within user-oriented assignment described above in a window. Visual interface 136 may include one or more graphical locator and/or cursor facilities allowing user to interact with data displayed; for instance, and without limitation, using a touchscreen, touchpad, mouse, keyboard, and/or other manual data entry device. In a non-limiting example, visual interface 136 may be displayed on user input device as described above. User may input user input 132 through visual interface 136 on user input device. Such interaction may be enabled via the touch screen. Visual interface may include one or more menus and/or panels permitting selection of data such as, without limitation, user input 132 (e.g., user response to user-specific question in user-oriented assignment), and the like to be displayed, used, and/or submitted, elements of apparatus 100 to be edited, added, and/or manipulated, options for importation of and/or linking to application programmer interfaces (APIs), exterior services, data source, machine-learning models, and/or algorithms, or the like. Persons skilled in the art, upon reviewing the entirety of this disclosure, will be aware of various ways in which a visual interface and/or elements thereof may be implemented and/or used as described in this disclosure.

With continued reference to FIG. 1, in some embodiments, at least a processor 120 may use optical character recognition (OCR) to process user data 128 such as, without limitation, user input into machine-readable text. In a non-limiting example, handwritten user input may be converted into standard text via optical character recognition. Optical character recognition may include automatic conversion of images of written, such as without limitation typed, handwritten or printed text, into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

With continued reference to FIG. 1, in some cases, OCR may be an "offline" process, which analyses a static document or image frame. In some cases, handwriting movement analysis can be used as input to a handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform, such as, without limitation, homography or affine transform, to image component to align text. In some cases, a de-speckle process may include removing positive and negative spots and/or smoothing edges. In some cases, a binarization process may include converting an image from color or greyscale to black-and-white, such as without limitation a binary image. Binarization may be performed as a simple way of separating text or any other desired image component from a background of image component. In some cases, binarization may be required for example if an employed OCR algorithm only works on binary images. In some cases. A line removal process may include removal of non-glyph or non-character imagery, such as without limitation boxes and lines. In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 2-5. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks, for example neural networks as described in reference to FIGS. 4-5.

With continued reference to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 120 may generate a chatbot. A "chatbot" as used in this disclosure is a program that communicates semantic information between an individual and a computing device. A chatbot may be communicative with processor 120. Processor 120 may be configured to operate a chatbot. In some cases, a chatbot may be local to processor 120. Alternatively, or additionally, in some cases, a chatbot may be remote to processor 120 and communicative with processor 120, by way of one or more networks, such as without limitation the internet. Alternatively, or additionally, a chatbot may communicate with processor 120 using telephonic devices and networks, such as without limitation fax machines, short message service (SMS), or multimedia message service (MMS). In some embodiments, a chatbot may communicate with processor 120 using text-based communication, for example without limitation using a character encoding protocol, such as American Standard for Information Interchange (ASCII). Processor 120 may interface with a chatbot, by way of at least a submission from a user, such as through the chatbot, and a response from the chatbot. In many cases, one or both of submissions and responses may be text-based communication. Alternatively, or additionally, in some cases, one or both of submissions and responses may be audio-based communication.

Continuing in reference to FIG. 1, a submission once received by processor 120 operating a chatbot, may be processed by processor 120. In some embodiments, processor 120 may process a submission using one or more keyword recognition, pattern matching, and natural language processing, machine learning models, and the like. In some embodiments, processor 120 may employ real-time learning with evolutionary algorithms. In some cases, processor 120 may retrieve a pre-prepared response from a storage component, based upon a submission. Alternatively, or additionally, in some embodiments, processor 120 may communicate a response without first receiving a submission, which may initiate a conversation. In some cases, processor 120 may communicate an inquiry to a chatbot. Processor 120 may be configured to process an answer to the inquiry in a following submission from a chatbot. In some cases, an answer to an inquiry present within a submission from a user through a chatbot may be used by processor 120 as an input to another function, for example without limitation, user input 132, and the like.

With continued reference to FIG. 1, processor 120 may process user data 128 including without limitation, textual user input from user, using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain: an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 120 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 120. In a non-limiting example, document may include recorded real-world conversation between user and other individuals in physical environment, generated through automatic speech recognition model described in further detail below. Document may also include user metadata expressed in a textual format; for instance, and without limitation, a time entry submitted by the user: "user studied subject x for y hours." Such document may be generated and/or modified by processor 120 as user's real-world activities proceed. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in some embodiments, processor 120 may utilize an automatic speech recognition model to process external datum 108, such as without limitation, voice/audio data from user. An automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 120. Processor 120 may then train an automatic speech recognition model according to training data which includes audible verbal content correlated to known content. In this way, processor 120 may analyze a person's specific voice and train an automatic speech recognition model to the person's speech, resulting in increased accuracy. Alternatively, or additionally, in some cases, processor 120 may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 120 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include a subject. For example, a subject may speak within solicitation video, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimates of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow processor 120 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. Neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition. Processor 120 may utilize an automatic speech recognition process to determine one or more voice inputs of external datum 108.

With continued reference to FIG. 1, user data 128 such as, without limitation, external datum 108, user input 132, user metadata, and the like, and/or any data described in this disclosure may be received and/or stored in a data store such as, without a limitation, a database. In some cases, data store may be disposed in virtual environment as described above. Data store may be implemented, without limitation, as a relational database, a key-value retrieval database such as a NOSQL database, or any other format or structure for use as a database that a person skilled in the art, after having reviewed the entirety of this disclosure, would recognize as suitable upon review of the entirety of this disclosure. Data store may alternatively or additionally be implemented using a distributed data storage protocol and/or data structure, such as a distributed hash table or the like. Data store may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a data store may store, retrieve, organize, and/or reflect data and/or records as used herein, as well as categories and/or populations of data consistently with this disclosure. However, the data store is not limited thereto. User data 128 such as, without limitation, user metadata may be received and/or stored in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may include and/or implement an immutable ledger, where data entries that have been posted to the immutable sequential listing cannot be altered. In a non-limiting example, user data 128 may include one or more Non-Fungible Token (NFT) associated with virtual avatar operated by the user, wherein the NFTs may be stored in immutable sequential listing in a decentralized platform. A "decentralized platform," as used in this disclosure, is a platform or server that enables secure data exchange between anonymous parties. Receiving user data 128 may include retrieving, by processor 120, NFTs and/or data related NFTs associated with the user from immutable sequential listing. For instance, and without limitation, NFT may be consistent with any NFT described in U.S. patent application Ser. No. 18/122,298, filed on Mar. 16, 2023, and titled "APPARATUS AND METHOD FOR EDUCATING AN ENTITY USING EXTENDED REALITY," the entity of which is incorporated by reference herein.

With continued reference to FIG. 1, processor 120 is configured to authenticate the user as a function of external datum 108 using a user authentication module. As used in this disclosure, a "user authentication module" is a component that is capable of verifying or validating external datum 108. Authentication of the user may include authorization credentials. As used in this disclosure, "authorization credentials" is information or data that confirms or seeks to confirm that user is licensed or certified to verify/validate external datum 108. Authorization credentials may include, as non-limiting examples, passwords, usernames, secret codes, pins, answers to secret questions, RSA codes, ID cards, diplomas, certificates, images of verifiers, fingerprints, eye scans, and the like. As a non-limiting example, authorization credentials may confirm that user is a licensed user such as a registered user. As used in this disclosure, "verification" is a process of ensuring that which is being "verified" complies with certain constraints, for example without limitation system requirements, regulations, and the like. In some cases, verification may include comparing a product, such as without limitation external datum against one or more acceptance criteria. For example, in some cases, external datum 108, such as, without limitation, facial images, fingerprints, retina, and the like may be required to match with an initial external datum 108, wherein the initial external datum 108 is an external datum 108 received and/or saved by processor 120 at a first time of user registration. Such initial external datum 108 may be saved and/or retrieved from the database. Ensuring that external datum 108 is in compliance with acceptance criteria may, in some cases, constitute verification. In some cases, verification may include ensuring that data is complete, for example that all required data types are present, readable, uncorrupted, and/or otherwise useful for processor 120. In some cases, some or all verification processes may be performed by processor 120. In some cases, at least a machine-learning process, for example a machine-learning model, may be used to verify. Processor 120 may use any machine-learning process described in this disclosure for this or any other function. In some embodiments, at least one of validation and/or verification includes without limitation one or more of supervisory validation, machine-learning processes, graph-based validation, geometry-based validation, and rules-based validation. "Validation," as described herein, is a process of ensuring that which is being "validated" complies with stakeholder expectations and/or desires. Stakeholders may include users, administrators, property owners, customers, users, and the like. Very often a specification prescribes certain testable conditions (e.g., metrics) that codify relevant stakeholder expectations and/or desires. In some cases, validation includes comparing product such as external datum 108 against a specification. In other cases, processor 120 may be additionally configured to validate a product by validating constituent sub-products.

With continued reference to FIG. 1, user authentication model 140 may include a computer vision model 144 configured to process external datum 108 pertaining to the user. As used in this disclosure, a "computer vision model" is a component with an implementation of machine vision system that is capable of reading, processing, or otherwise analyzing external datum 108. In some embodiments, computer vision model 144 may be in communication with optical device 112 of sensory device 104. Processing external datum 108 may include reading and/or matching external datum 108 to initial external datum as described above. Computer vision model may use images from optical device 112 such as, without limitation, at least a camera, to make a determination about a scene, space, and/or object. For example, and without limitation, computer vision model 144 may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, computer vision model 144 may be further configured to determine an external user identifier as a function of the external datum. As used in this disclosure, an "external user identifier" is an element of data configured to efficiently identify a user based on the user's external datum. External user identifier may serve as a key for user identification using external datum 108. In a non-limiting example, external user identifier may include a recorded and/or segmented audio containing user's voice that represents the identification of the user (i.e., audio identification). In some cases, external user identifier may include normalized user's external datum. In some embodiments, and without limitation, external user identifier may include data related to a key features of user's exterior representation; for instance, and without limitation, external user identifier may include data related to user's body shape, face, hand, and the like, recognized by computer vision model 144 and saved by processor 120 in data store described above. In a non-limiting example, processor 120 may configure computer vision model 144 to process external datum 108 such as, without limitation, an image of the user, and normalize the image into one or more feature maps, wherein the feature map may include image only containing key features of the user in a much smaller size such as, without limitation, 32×32 pixels. Additionally, or alternatively, at least a machine-learning process, for example a machine-learning model, may be used by computer vision model 144 to process external datum 108 and/or enable user authentication module 140 to verify/validate external datum 108, configured by processor 120. For instance, and without limitation, computer vision model 144 may employ neural networks, for example neural networks as described in reference to FIGS. 4-5. Such computer vision model 144 may be trained using image training data, wherein the image training data includes a set of media data (e.g., image, video, and the like) with assigned labels. In a non-limiting example, labels may include external user identifiers. Computer vision model 144 may be trained using image training data containing a plurality of external data as input and a plurality of external user identifiers as output. Processor 120 may generate external user identifier using the trained computer vision model 144.

With continued reference to FIG. 1, in some embodiments, authenticating the user may include verifying external datum 108 and generating an external verification datum 148 as a function of the verification. Verification may include any verification/validation of external datum 108 as described above. As used in this disclosure, an "external verification datum" is an element of data representing a result of external data verification. "External data verification," for the purpose of this disclosure, is a process in which one or more external data are checked for accuracy and consistency against the reality. In some cases, external verification datum 148 may include a data structure containing values representing yes-or-no answers; for instance, and without limitation, external verification datum 148 may include value in Boolean data type such as "TRUE" or "FALSE." In some embodiment, processor 120 may compare external datum 108 to a pre-determined external datum criteria such as, without limitation, data related to pre-determined user's facial expressions, actions, physical locations, identifications, and the like thereof. In some cases, pre-determined external datum criteria may include external user identification as described above. Computer vision model 144 may be configured by processor 120 to recognize such data from external datum 108. Processor 120 may generate a positive external verification datum 148 of "TRUE" if external datum 108 matches with the pre-determined external datum criteria. On the other hand, processor 120 may generate a negative external verification datum 148 of "FALSE" if external datum 108 failed to match with the pre-determined external datum criteria. In a non-limiting example, such external verification datum 148 may be used to grant user access to a virtual education environment 152, wherein the virtual education environment 152 comprises a plurality of virtual education elements 156. As used in this disclosure, a "virtual education environment" is an extended reality space extended reality space, such as, without limitation, augmented reality (AR) space, virtual reality (VR) space, and/or any other digital realities for educational use. In some cases, extended reality space may include a virtual classroom, virtual meeting room, virtual study room, and the like thereof. In a non-limiting example, virtual education environment may include any virtual environment described in U.S. patent application Ser. No. 18/122,340, filed on Mar. 16, 2023, and titled "APPARATUS AND METHOD FOR GENERATING AN EDUCATIONAL ACTION DATUM USING MACHINE-LEARNING," the entity of which is incorporated by reference herein. Virtual education environment may only open to the user if processor 120 receives positive external verification datum and may prohibit the user from entering if processor 120 receives negative external verification datum. Each "virtual education element" of plurality of virtual education elements 156, for the purpose of this disclosure, are digital objects within virtual education environment 152. In some embodiments, plurality of virtual education elements 156 may be generated based on virtual education environment. In a non-limiting example, processor 120 may generate a virtual blackboard in a virtual classroom. Virtual blackboard may display questions to the user and/or accepting answers to displayed questions from the user if processor 120 receives positive external verification datum. However, questions may not be displayed, and the user may not interact with virtual blackboard if processor 120 receives negative external verification datum. In a non-limiting example, plurality of virtual education elements 156 may include one or more educational models, wherein the educational model is defined as a component in communication with virtual avatar operated by the user. Educational model may be consistent with any educational model described in U.S. patent application Ser. No. 18/122,298, filed on Mar. 16, 2023, and titled "APPARATUS AND METHOD FOR EDUCATING AN ENTITY USING EXTENDED REALITY," the entity of which is incorporated by reference herein.

With continued reference to FIG. 1, in some embodiments, authenticating the user may further include generating a haptic feedback 160 as a function of external verification datum 148. As used in this disclosure, a "haptic feedback" is a physical communication with the user. In some embodiments, haptic feedback 160 may include a user of touch to communicate with the user. Apparatus 100 may utilize one or more aspects of haptic technology to generate haptic feedback 160. As used in this disclosure, a "haptic technology" is a technology that can create a physical experience, in particular, experience of touch, by applying various forces, vibrations, or motions to the user. In some embodiments, haptic technology may be used to create virtual educational elements 156 as described above via a computer simulation, wherein the computer simulation is a process of mathematical modelling, performed by processor 120, which is designed to predict a behavior of, or an outcome of, a real-world system. In other embodiments, haptic technology may be also used to control plurality of virtual education elements 156. In a non-limiting example, processor 120 may be configured to generate a haptic feedback of a virtual pen and paper via haptic technology in virtual education environment to mimic real-world writing using an actual pen and paper. Haptic feedback may be transferred into the physical world through one or more devices that configured to control virtual education environment and/or virtual education element, such as, without limitation, joy stick, user input device, any computing device described in this disclosure. Apparatus 100 may implement one or more aspects of haptic technology to one or more components within apparatus 100, for instance, and without limitation, sensory device 104 may incorporate a tactile sensor configured to measure forces exerted by the user on visual interface 136 on user input device. In a non-limiting example, processor 120 may generate a first haptic feedback if processor 120 receives positive external verification datum and may generate a second haptic feedback if processor 120 receives negative external verification datum, wherein the first haptic feedback may be different than the second haptic feedback. In some cases, difference between first haptic feedback and second haptic feedback may include, without limitation, magnitude of force, vibration frequency, movement range, and the like thereof. In some embodiments, haptic feedback 160 may include haptic feedback generate from eccentric rotating mass (ERM) actuator, wherein the eccentric rotating mass actuator is a rotating electric motor with an off-center mass. Such haptic feedback may include a net centrifugal force caused by the ERM rotation (i.e., constant displacement). In some embodiments, haptic feedback 160 may include haptic feedback generate from a linear resonant actuator (LRA), wherein the linear resonant actuator is a component containing a magnet attached to a spring, surrounded by a coil, and encased in a housing. Such haptic feedback may include vibration generated by the mass moves back and forth within an energized electromagnetic coil. In other embodiments, haptic feedback 160 may further include other haptic feedback generated from, without limitation, Apple tactic engine, piezoelectric actuator, forced impact, and the like thereof. Persons skilled in the art, upon reviewing the entirety of this disclosure, will be aware of various haptic technologies that may be applied to generate haptic feedback 160 as described in this disclosure. Processor 120 may further transmit haptic feedback 160 to the user. For example, and without limitation, haptic feedback 160 may be offered by haptic device in physical contact with the user. Haptic device may include components and/or devices of apparatus 100, and/or devices communicatively connected to apparatus 100 such as, without limitation, sensory device 104, user input device, and the like. Such haptic device may include an embedded eccentric rotating mass (ERM) actuator configured to offering haptic feedback 160.

With continued reference to FIG. 1, processor 120 is configured to generate educational training data 164 as a function of the user data 128. In one or more embodiments, one or more machine-learning models described in this disclosure, or any other machine-learning models may be generated and/or trained using educational training data. Educational training data 164 may include inputs and corresponding predetermined outputs so that one or more machine-learning models may use correlations between the provided exemplary inputs and outputs to develop an algorithm and/or relationship that then allows one or more machine-learning models to determine its own outputs for inputs. Educational training data 164 may contain correlations that a machine-learning process may use to model relationships between two or more categories of data elements. Exemplary inputs and outputs may come from data store as described above or be provided by the user. In other embodiments, a machine-learning module may obtain educational training data 164 by querying a communicatively connected data store that includes past inputs and outputs. Educational training data may include inputs from various types of data stores, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, educational training data 164 may be formatted and/or organized by categories of data elements by, for example, associating data elements with one or more descriptors corresponding to categories of data elements. As a non-limiting example, educational training data 164 may include data entered in standardized forms by persons or processes, such that entry of a given data element in a given field in a form may be mapped to one or more descriptors of categories. Elements in educational training data 164 may be linked to descriptors of categories by tags, tokens, or other data elements.

With continued reference to FIG. 1, generating educational training data 164 may include generating a user implication identifier 168 as a function of external datum 108 pertaining to the user. As used in this disclosure, a "user implication identifier" is a datum that identifies implied information from external datum 108. For instance, and without limitation, educational training data may be used to show external datum 108 may indicate a particular user implication identifier 168. In an embodiment, user implication identifier 168 may include data related to user's mental activities, identified from external datum 108 by processor 120. In such embodiment, user implication identifier 168 may include data related to a current feeling of the user. In a non-limiting example, external datum 108 of a user captured by sensory device 104 may include data related to user's micro-expressions such as a frown, detected by computer vision model 144, wherein the user may be in a progress of completing user-oriented assignment. Processor 120 may correlate user implication identifier 168 of "feel difficult" to such external datum 108. In another embodiments, user implication identifier 168 may include data related to user's emotions, identified from external datum 108 by computer vision model 144. Emotions may include, without limitation, happiness, sadness, fear, anger, nervousness, disgust, tiredness, and the like thereof. In a non-limiting example, external datum 108 of a user captured by sensory device 104 may include data related to user's eye movement. Processor 120 may correlate user implication identifier 168 of "tiredness" to such external datum 108 when such external datum 108 detects user with eyes closed for a significant amount of time. In a further embodiments, user implication identifier 158 may include data related to user's physical health. In such embodiment, user implication identifier 156 may indicate user's current health status. In a non-limiting example, external datum 108 captured by sensory device 104 may include user's body temperature. Processor 120 may correlate user implication identifier 168 of "sick" to such external datum 108 if such external datum 108 exceeds a threshold external datum, for example, threshold body temperature value (i.e., 99.5 F or 37.5 C).

With continued reference FIG. 1, processor 120 may be configured to use a machine learning module, to implement one or more algorithms or generate one or more machine-learning models, such as a user implication classifier, to determine a user implication identifier 168. In some cases, user implication classifier may be incorporated by computer vision model as described above in this disclosure. Processor 120 may be configured to train user implication classifier using user implication training data (i.e., image training data), wherein the user implication training data may include a plurality of external data as input correlated to a plurality of user implication identifiers. For example, and without limitation, user implication training data may be used to show how user's external datum may indicate one or more user implication identifiers. However, the machine-learning module is exemplary and may not be necessary to generate one or more machine-learning models and perform any machine-learning described herein. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 120 and/or another device may generate a classifier using a classification algorithm, defined as a process whereby a processor 120 derives a classifier from training data, such as user designation training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. User implication classifier may classify user data into user implication identifier 168. For instance, and without limitation, user implication classifier may receive external datum 108, and classify received external datum 108 into a user implication identifier 168.

Still referring to FIG. 1, in some embodiments, processor 120 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 120 may then calculate a likelihood table by calculating probabilities of different data entries and classification labels. Processor 120 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Continuing to refer to FIG. 1, processor 120 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters, forms and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 6:
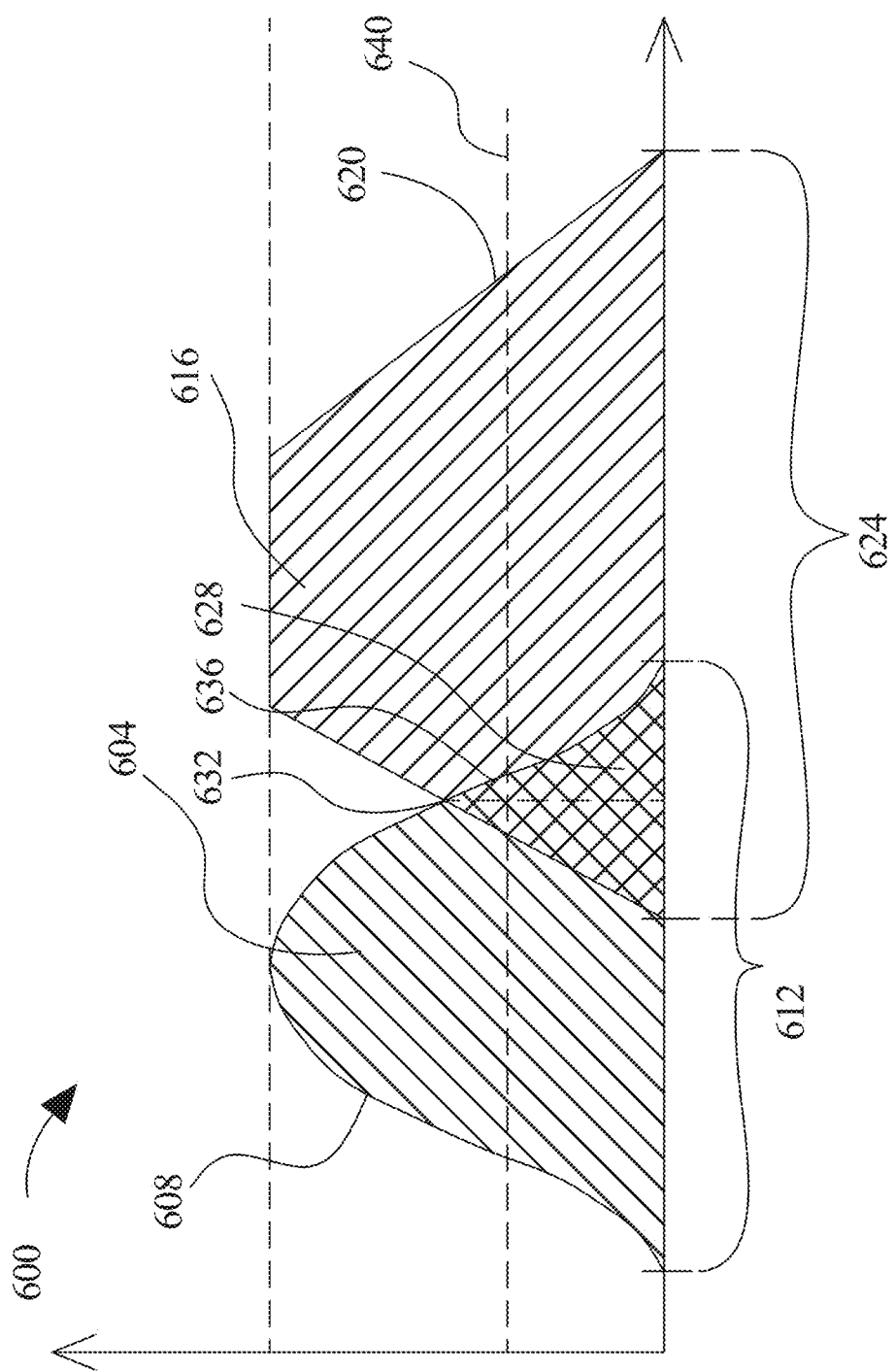
FIG. 6 is a graph illustrating an exemplary relationship between fuzzy sets.

Alternatively, or additionally, and still referencing FIG. 1, a fuzzy inferencing system for determination of user implication identifier 168 may be employed, where any or all user implication identifiers may be represented as values and/or fuzzy sets for linguistic variables measuring the same, as described in more detail in FIG. 6. An inferencing system may use one or more fuzzy inferencing rules, as described below in FIG. 6, to output one or more linguistic variable values and/or defuzzified values indicating one or more user implication identifiers 168.

With continued reference to FIG. 1, generating educational training data 164 may further include assigning user implication identifier 168 to user data 128. In some embodiments, assigning user implication identifier 168 to user data 128 may include linking user implication identifier 168 to user data 128. In a non-limiting example, processor 120 may be configured to initialize a data structure designed to wrap both user data 128 and corresponding user implication identifier 168 determined based on external data 108 of user data 128. Such data structure may include, without limitation, a vector, a dictionary, a linked list, a graph, and the like thereof. Additionally, or alternatively, assigning user implication identifier 168 to user data 128 may include generating a user data and implication pair. As used in this disclosure, a "user data and implication pair" is a set of two elements: user data 128 and corresponding user implication identifier 168 that regarded as a single unit. In some cases, user data and implication pair may be initialized by processor 120 in data structure listed above. In a non-limiting example, user data and implication pair may include user input 132 paired with one or more user implication identifiers 168. Further, generating educational training data 164 may include correlating user data and implication pair to a set of desirable outputs such as, without limitation, user input modifier as described in further detail below. In a non-limiting example, educational training data 164 may include a plurality of user data and implication pairs as input and correlated to a plurality of user input modifiers as output.

With continued reference to FIG. 1, processor 120 is configured to train an educational machine-learning model 172, generated by machine-learning module as described above, using educational training data, and determine a user input modifier 176. As used in this disclosure, a "user input modifier" is an element of data added into user input 132 that makes at least partial changes to user input 132. In a non-limiting example, user input 132 may include one or more answers to user-specific questions within user-oriented assignment. In this case, user input modifier 176 may include one or more revisions to user input 132. For instance, and without limitation, user-specific question may include a differential equation. User input 132 may include a derivative of the differential equation done by the user. User input modifier 176 determined by processor 120 may include one or more markups correcting the derivative. In some cases, user input modifier 176 may have no effect on user input 132. Continuing the example, user may input a correct derivative at the first time. User input modifier 176 correlated to such input may include no changes; therefore, user input modifier 176 may be empty. In some embodiments, user data modifier 176 may include data related to the process of insertion, modification, or otherwise revision of user input 132. In a non-limiting example, user input modifier 176 correlated to an answer (i.e., user input 132) of a user specific question may include a detailed guide or list of steps directing the user to the correct answer. Additionally, or alternatively, user input modifier 176 may be determined based on user implication identifier 168. In some embodiments, processor 120 may determine different user input modifiers for same user input 132 based on different user implication identifiers. In a non-limiting example, processor 120 may match different user input modifiers to user input 132 according to user implication identifier 168 determined upon external datum 108. For instance, and without limitation, processor 120 may determine a user input modifier including a detailed guide of how to approach one or more user-specific questions for a user input based on a user implication identifier of "feel confused," wherein such user implication identifier 168 may be determined based on user's external datum 108 containing data indicating user's current arm movements, for example, scratching head. As another example, and without limitation, processor 120 may determine a second user input modifier including a words of inspiration related to user-oriented assignment for a user input based on a user implication identifier of "sadness," wherein such user implication identifier 168 may be determined based on user's external datum 108 containing data indicating user's current facial expression, for example, crying. Educational training data generated by processor 120 may include a plurality of user data and implication pairs, each correlated to a user input modifier 176 for the user input 132. Processor 120 is configured to determine user input modifier 176 using educational machine-learning model 172 trained using such educational training data. Additionally, or alternatively, processor 120 may be further configured to apply user input modifier 176 to the user input 132. User input modifier 176 may be aggregated with user input 132. Aggregated user input may be displayed by processor 120 through visual interface 136 as described above in this disclosure.

Figure 2:
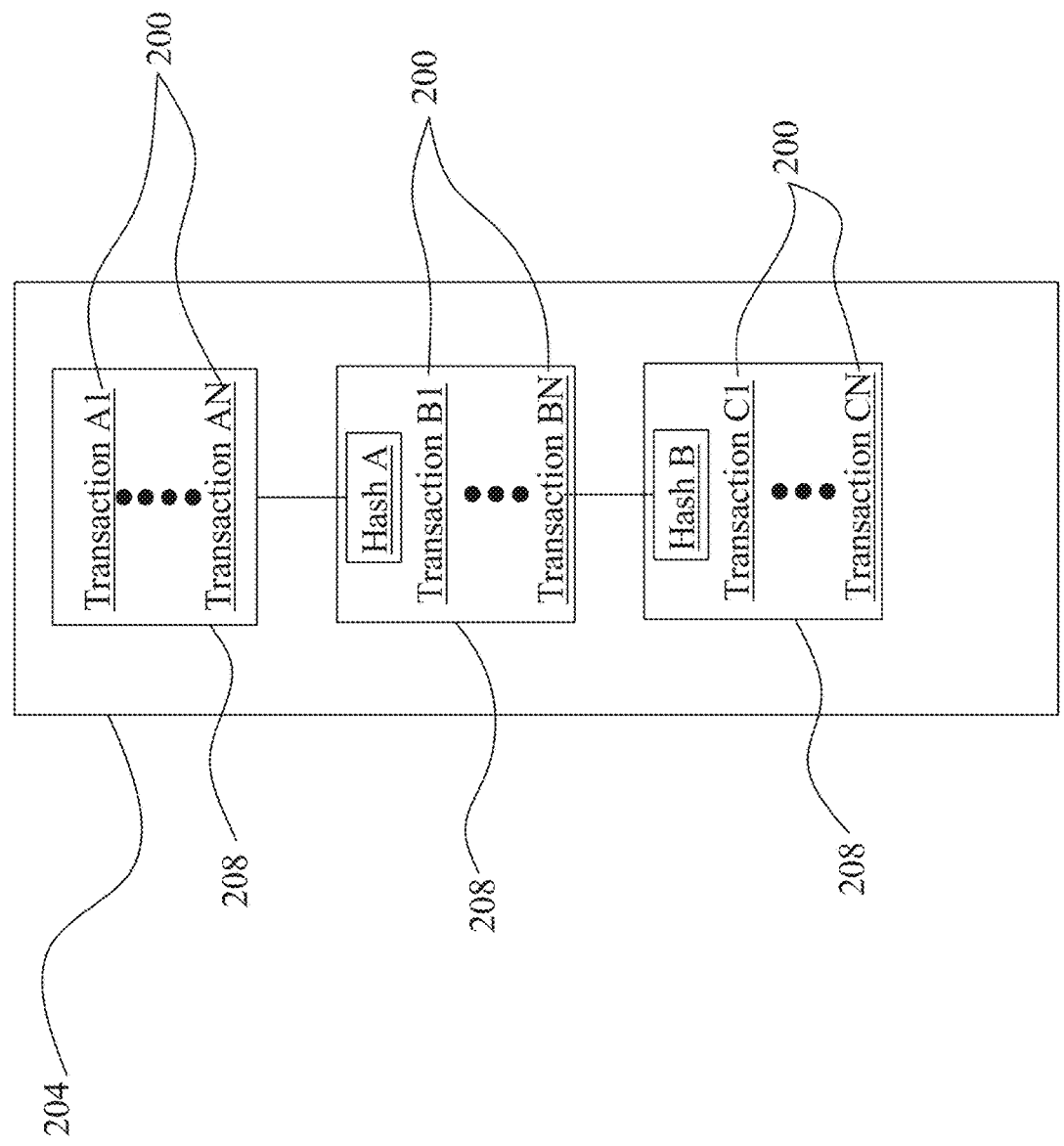
FIG. 2 is an exemplary embodiment of an immutable sequential listing.

Referring now to FIG. 2, an exemplary embodiment of an immutable sequential listing is illustrated 200. An immutable sequential listing 200 may be, include and/or implement an immutable ledger, where data entries that have been posted to immutable sequential listing 200 cannot be altered. Data elements are listed in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 208 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 208 may describe the transfer of a physical good; for instance, a digitally signed assertion 208 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 208 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 208. In some embodiments, address is linked to a public key, the corresponding private key of which is owned by the recipient of a digitally signed assertion 208. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 208 may record a subsequent a digitally signed assertion 208 transferring some or all the value transferred in the first a digitally signed assertion 208 to a new address in the same manner. A digitally signed assertion 208 may contain textual information that is not a transfer of some item of value in addition to, or as an alternative to, such a transfer. For instance, as described in further detail below, a digitally signed assertion 208 may indicate a confidence level associated with a distributed storage node as described in further detail below.

In an embodiment, and still referring to FIG. 2 immutable sequential listing 204 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 204 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 204 may preserve the order in which the at least a posted content took place by listing them in chronological order; alternatively or additionally, immutable sequential listing 204 may organize digitally signed assertions 208 into sub-listings 212 such as "blocks" in a blockchain, which may be themselves collected in a temporally sequential order; digitally signed assertions 208 within a sub-listing 212 may or may not be temporally sequential. The ledger may preserve the order in which at least a posted content took place by listing them in sub-listings 212 and placing the sub-listings 212 in chronological order. The immutable sequential listing 204 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 204 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.92 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 204, once formed, may be inalterable by any party, no matter what access rights that party possesses. For instance, immutable sequential listing 204 may include a hash chain, in which data is added during a successive hashing process to ensure non-repudiation. Immutable sequential listing 204 may include a block chain. In one embodiment, a block chain is immutable sequential listing 204 that records one or more new at least a posted content in a data item known as a sub-listing 212 or "block." An example of a block chain is the BITCOIN block chain used to record BITCOIN transactions and values. Sub-listings 212 may be created in a way that places the sub-listings 212 in chronological order and link each sub-listing 212 to a previous sub-listing 212 in the chronological order so that any computing device may traverse the sub-listings 212 in reverse chronological order to verify any at least a posted content listed in the block chain. Each new sub-listing 212 may be required to contain a cryptographic hash describing the previous sub-listing 212. In some embodiments, the block chain contains a single first sub-listing 212 sometimes known as a "genesis block."

Still referring to FIG. 2, the creation of a new sub-listing 212 may be computationally expensive; for instance, the creation of a new sub-listing 212 may be designed by a "proof of work" protocol accepted by all participants in forming the immutable sequential listing 204 to take a powerful set of computing devices a certain period of time to produce. Where one sub-listing 212 takes less time for a given set of computing devices to produce the sub-listing 212 protocol may adjust the algorithm to produce the next sub-listing 212 so that it will require more steps; where one sub-listing 212 takes more time for a given set of computing devices to produce the sub-listing 212 protocol may adjust the algorithm to produce the next sub-listing 212 so that it will require fewer steps. As an example, protocol may require a new sub-listing 212 to contain a cryptographic hash describing its contents; the cryptographic hash may be required to satisfy a mathematical condition, achieved by having the sub-listing 212 contain a number, called a nonce, whose value is determined after the fact by the discovery of the hash that satisfies the mathematical condition. Continuing the example, the protocol may be able to adjust the mathematical condition so that the discovery of the hash describing a sub-listing 212 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 212 according to the protocol is known as "mining." The creation of a new sub-listing 212 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 212. The incentive may be financial; for instance, successfully mining a new sub-listing 212 may result in the person or entity that mines the sub-listing 212 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 212 Each sub-listing 212 created in immutable sequential listing 204 may contain a record or at least a posted content describing one or more addresses that receive an incentive, such as virtual currency, as the result of successfully mining the sub-listing 212.

With continued reference to FIG. 2, where two entities simultaneously create new sub-listings 212, immutable sequential listing 204 may develop a fork; protocol may determine which of the two alternate branches in the fork is the valid new portion of the immutable sequential listing 204 by evaluating, after a certain amount of time has passed, which branch is longer. "Length" may be measured according to the number of sub-listings 212 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 212 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 204 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 204.

Still referring to FIG. 2, additional data linked to at least a posted content may be incorporated in sub-listings 212 in the immutable sequential listing 204; for instance, data may be incorporated in one or more fields recognized by block chain protocols that permit a person or computer forming a at least a posted content to insert additional data in the immutable sequential listing 204. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 212 in a block chain computationally challenging; the incentive for producing sub-listings 212 may include the grant of new crypto currency to the miners. Quantities of crypto currency may be exchanged using at least a posted content as described above.

Figure 3:
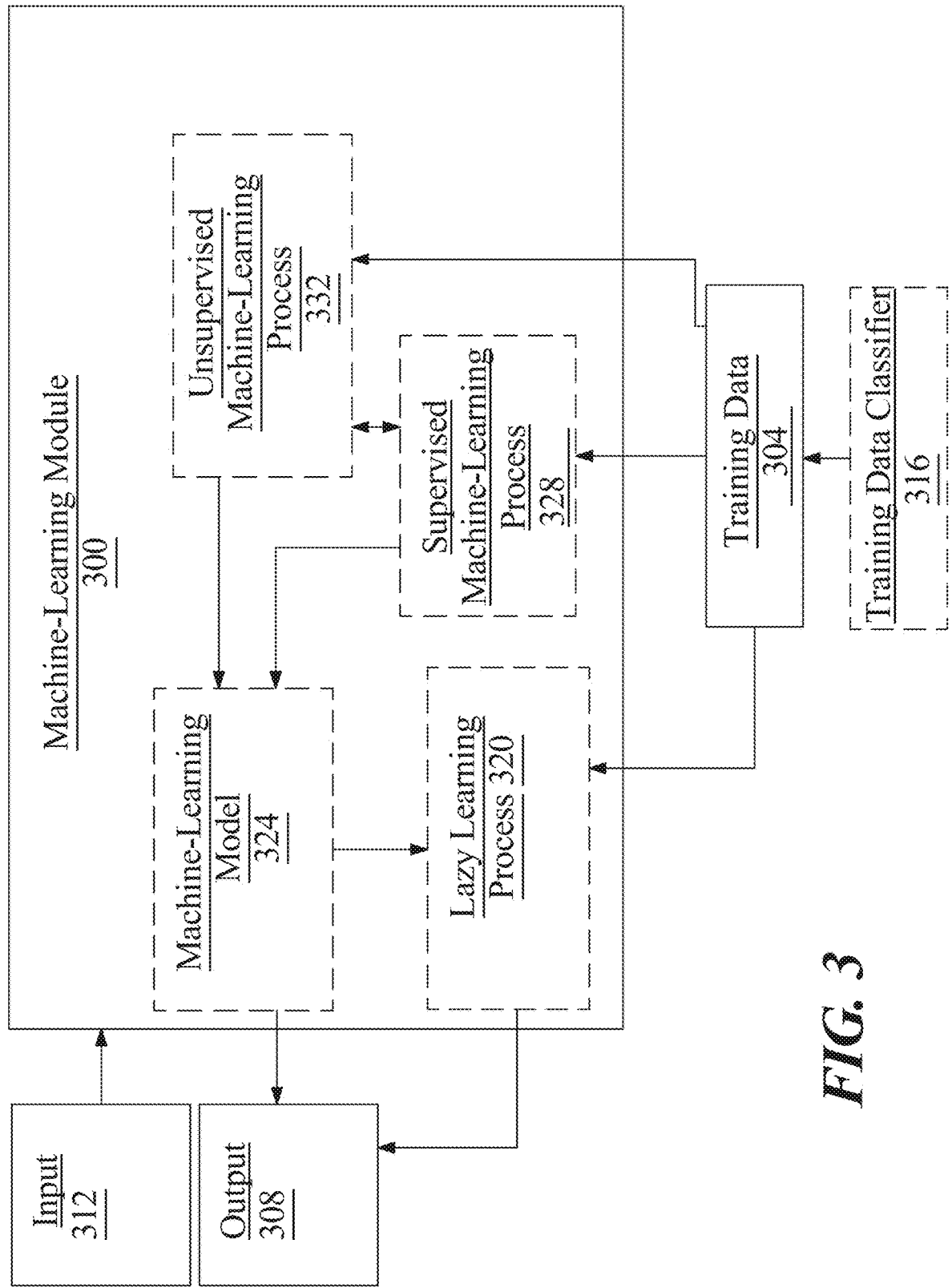
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. Machine-learning process may use training data 304 to generate an algorithm that will be performed by processor 120/module to produce outputs 308 given data provided as inputs 313; this is in contrast to a non-machine learning software program where the commands to be executed are determined in advance by a user and written in a programming language. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and with continued reference to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

With continued reference to FIG. 3, training data may be filtered, sorted, and/or selected using one or more supervised and/or unsupervised machine-learning processes and/or models as described in further detail below; such models may include without limitation a training data classifier 318. Training data classifier 318 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby apparatus 100 and/or any module and/or component operating thereon derives a classifier from training data 304. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory 118; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs, as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With continued reference to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
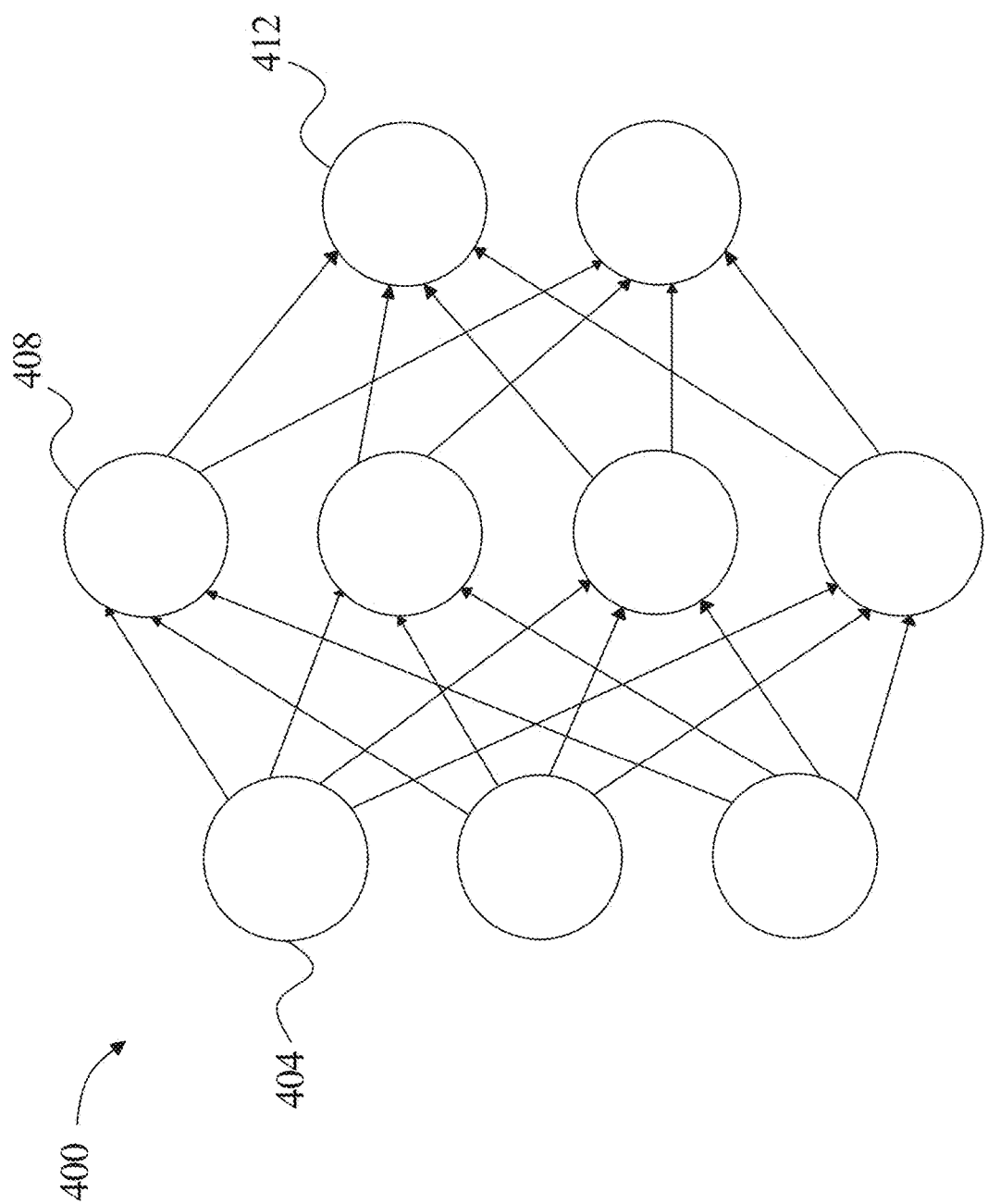
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
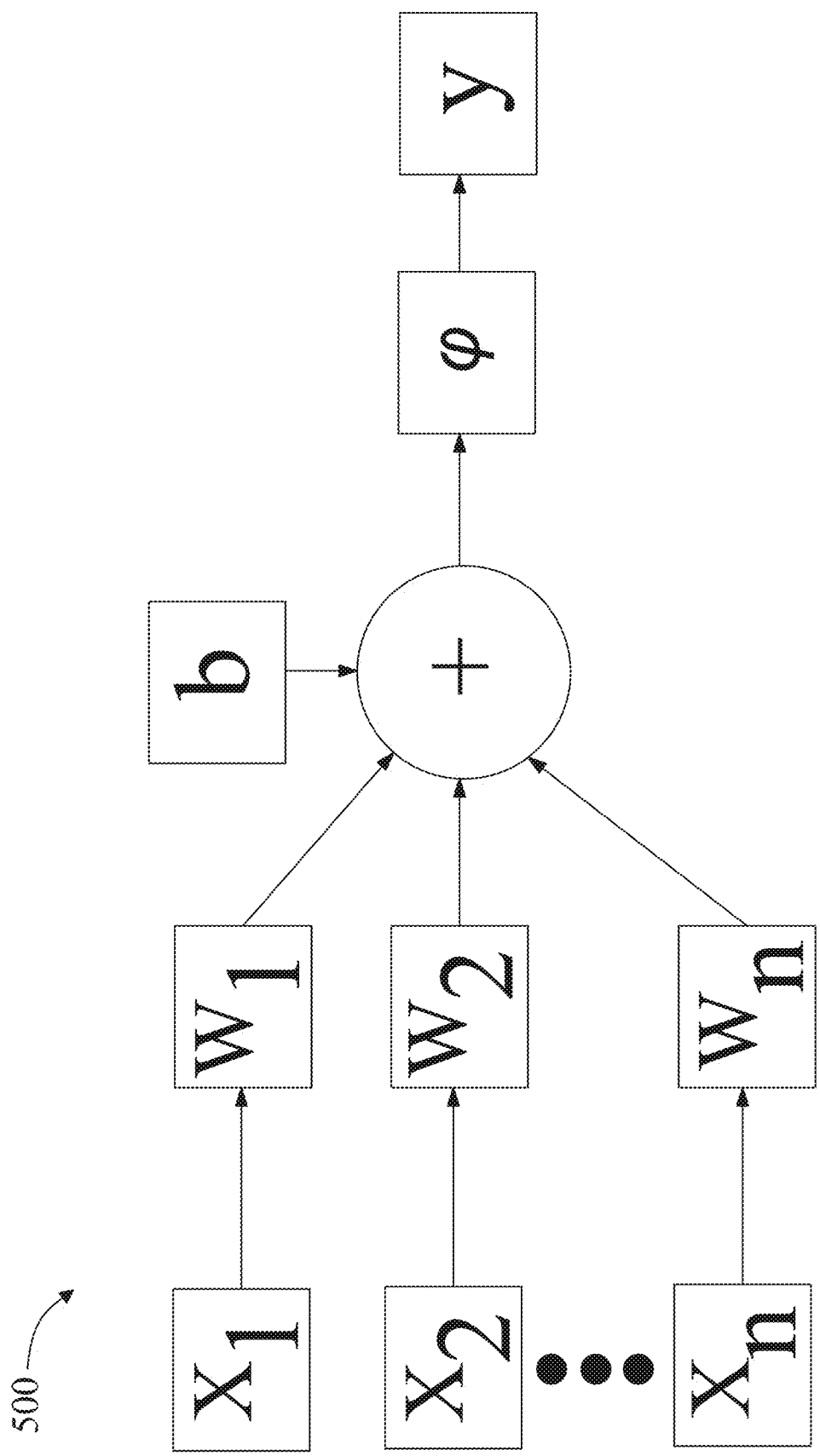
FIG. 5 is a diagram of an exemplary embodiment of a node of a neural network.

Referring now to FIG. 5, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 6, first fuzzy set 604 may represent any value or combination of values as described above, including output from one or more machine-learning models and/or a predetermined class. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 672 representing a probability, as defined on probability interval, of a match between first fuzzy set 604 and second fuzzy set 616. Alternatively, or additionally, a single value of first and/or second fuzzy set may be located at a locus 676 on first range 612 and/or second range 624, where a probability of membership may be taken by evaluation of first membership function 608 and/or second membership function 620 at that range point. A probability at 628 and/or 672 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or a predetermined class for combination to occur as described above. Alternatively, or additionally, each threshold may be tuned by a machine-learning and/or statistical process, for instance and without limitation as described in further detail below.

With continued reference to FIG. 6, in an embodiment, a degree of match between fuzzy sets may be used to classify any data described as classified above. Where multiple fuzzy matches are performed, degrees of match for each respective fuzzy set may be computed and aggregated through, for instance, addition, averaging, or the like, to determine an overall degree of match.

With continued reference to FIG. 6, in an embodiment, an element of data may be compared to multiple fuzzy sets. For instance, the element of data may be represented by a fuzzy set that is compared to each of the multiple fuzzy sets representing, e.g., values of a linguistic variable; and a degree of overlap exceeding a threshold between the datum-linked fuzzy set and any of the multiple fuzzy sets may cause computing device to classify the datum as belonging to each such categorization. Machine-learning methods as described throughout may, in a non-limiting example, generate coefficients used in fuzzy set equations as described above, such as without limitation x, c, and $\sigma$ of a Gaussian set as described above, as outputs of machine-learning methods.

With continued reference to FIG. 6, a computing device may use a logic comparison program, such as, but not limited to, a fuzzy logic model to determine an output and/or response. An output and/or response may include, but is not limited to low, medium, advanced, superior, good, bad, and the like; each such output and/or response may be represented as a value for a linguistic variable representing output and/or response or in other words a fuzzy set as described above that corresponds to a degree of completion as calculated using any statistical, machine-learning, or other method that may occur to a person skilled in the art upon reviewing the entirety of this disclosure.

With continued reference to FIG. 6, an inference engine may be implemented according to input and/or output membership functions and/or linguistic variables. For instance, a first linguistic variable may represent a first measurable value pertaining to an element being input to the inferencing system while a second membership function may indicate a degree and/or category of one or more other attributes and/or values that may be associated with a user. Continuing the example, an output linguistic variable may represent, without limitation, a value representing a strength and/or deficiency. An inference engine may combine rules the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)$\leq$ T(c, d) if a$\leq$c and b$\leq$d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "$\perp$," such as max(a, b), probabilistic sum of a and b (a+b−a*b), bounded sum, and/or drastic T-conorm; any T-conorm may be used that satisfies the properties of commutativity: $\perp$(a, b)=$\perp$(b, a), monotonicity: $\perp$(a, b)$\leq$ $\perp$(c, d) if a$\leq$ c and b$\leq$d, associativity: $\perp$(a, $\perp$(b, c))=$\perp$($\perp$(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 7:
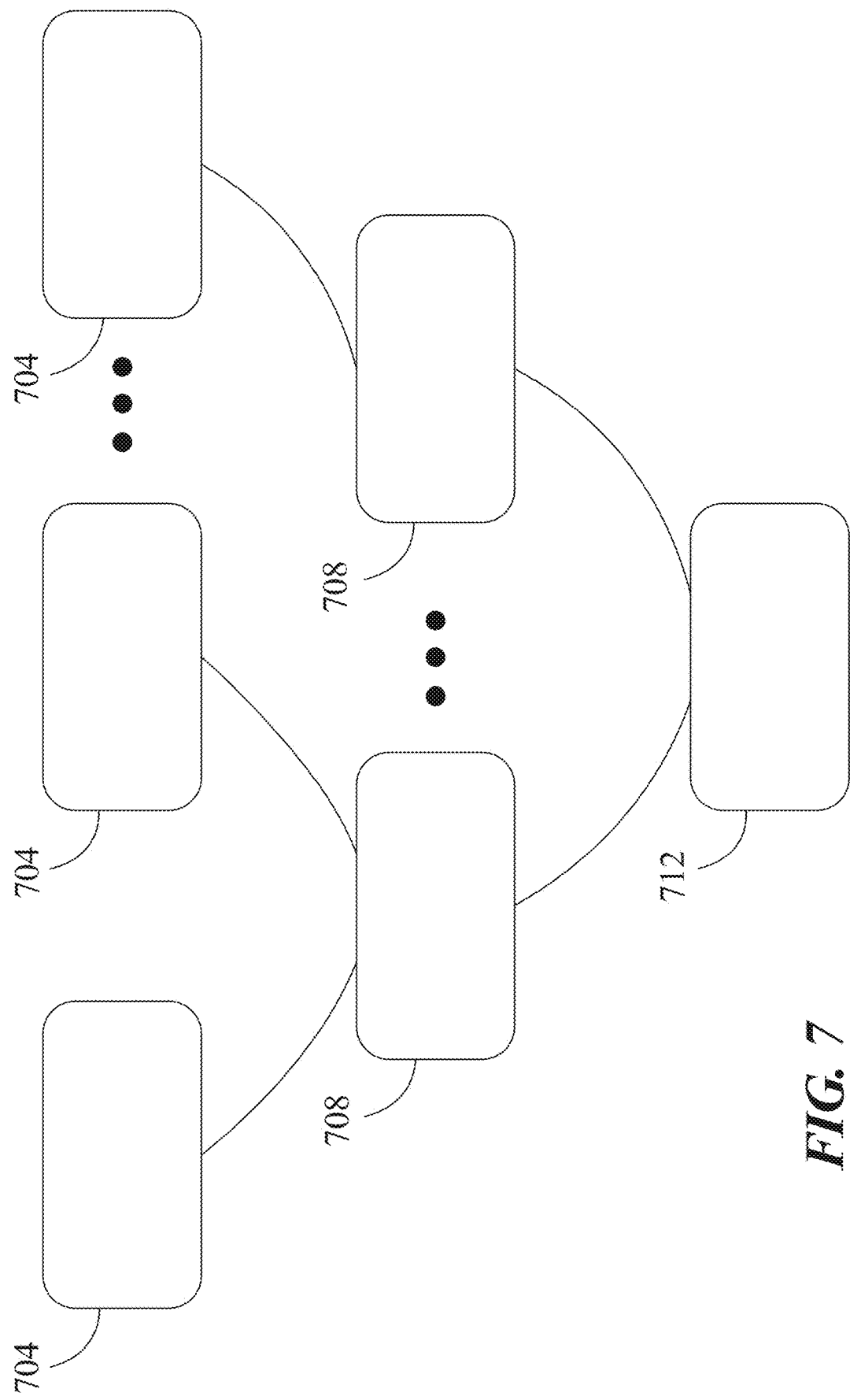
FIG. 7 is an exemplary embodiment of a cryptographic accumulator.

Referring now to FIG. 7, an exemplary embodiment of a cryptographic accumulator 700 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 700 has a plurality of accumulated elements 704, each accumulated element 704 generated from a lot of the plurality of data lots. Accumulated elements 704 are create using an encryption process, defined for this purpose as a process that renders the lots of data unintelligible from the accumulated elements 704; this may be a one-way process such as a cryptographic hashing process and/or a reversible process such as encryption. Cryptographic accumulator 700 further includes structures and/or processes for conversion of accumulated elements 704 to root 712 element. For instance, and as illustrated for exemplary purposes in FIG. 7, cryptographic accumulator 700 may be implemented as a Merkle tree and/or hash tree, in which each accumulated element 704 created by cryptographically hashing a lot of data. Two or more accumulated elements 704 may be hashed together in a further cryptographic hashing process to produce a node 708 element; a plurality of node 708 elements may be hashed together to form parent nodes 708, and ultimately a set of nodes 708 may be combined and cryptographically hashed to form root 712. Contents of root 712 may thus be determined by contents of nodes 708 used to generate root 712, and consequently by contents of accumulated elements 704, which are determined by contents of lots used to generate accumulated elements 704. As a result of collision resistance and avalanche effects of hashing algorithms, any change in any lot, accumulated element 704, and/or node 708 is virtually certain to cause a change in root 712; thus, it may be computationally infeasible to modify any element of Merkle and/or hash tree without the modification being detectable as generating a different root 712. In an embodiment, any accumulated element 704 and/or all intervening nodes 708 between accumulated element 704 and root 712 may be made available without revealing anything about a lot of data used to generate accumulated element 704; lot of data may be kept secret and/or demonstrated with a secure proof as described below, preventing any unauthorized party from acquiring data in lot.

Alternatively, or additionally, and still referring to FIG. 7, cryptographic accumulator 700 may include a "vector commitment" which may act as an accumulator in which an order of elements in set is preserved in its root 712 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 700 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 8:
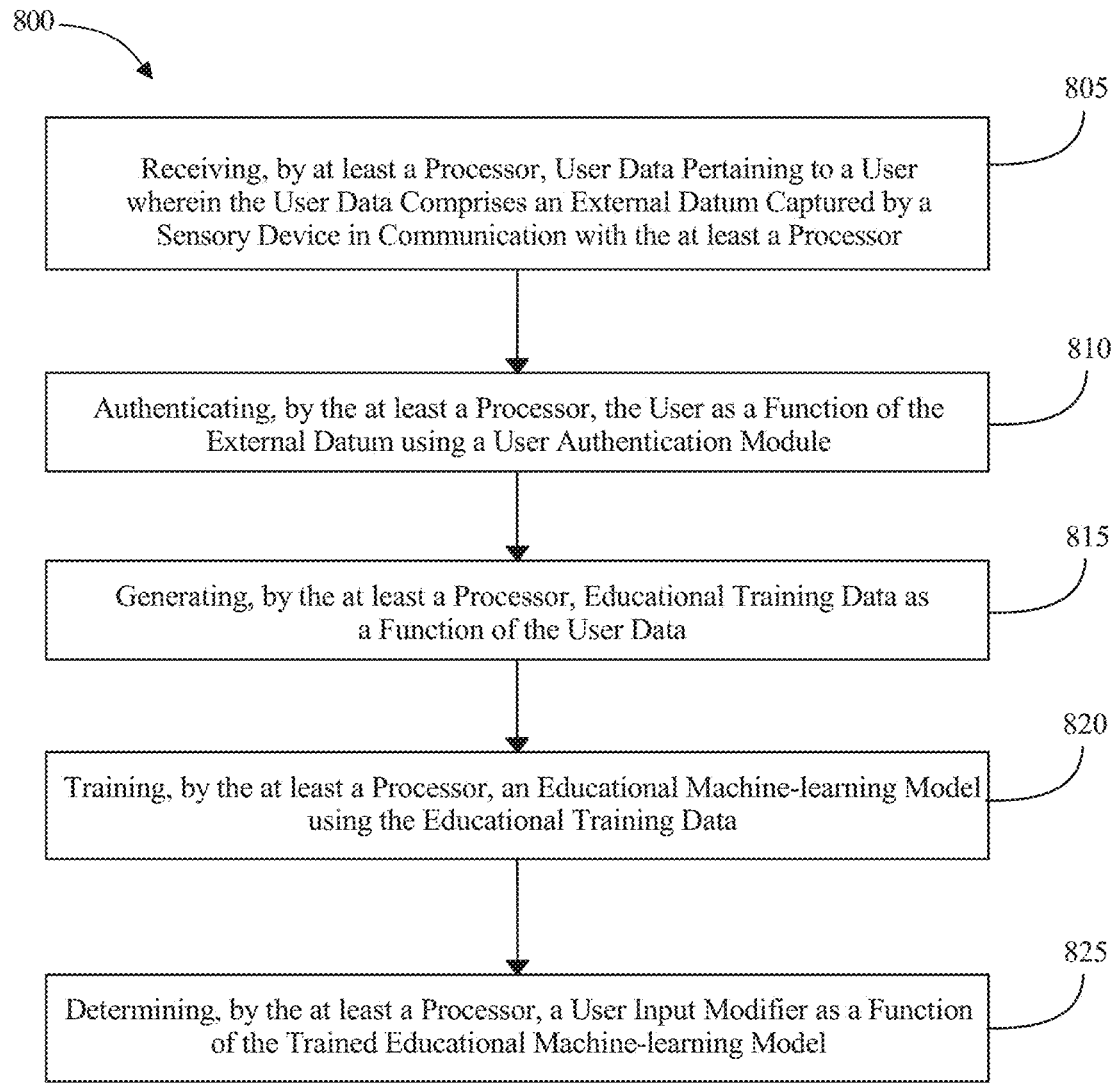
FIG. 8 is a flow diagram illustrating an exemplary method for training an educational machine-learning model.

Referring now to FIG. 8, a flow diagram of a method 800 for training an educational machine-learning model is illustrated. Method 800 includes a step 805 of receiving, by at least a processor, user data pertaining to a user, wherein the user data includes an external datum captured by a sensory device in communication with the at least a processor and a user input accepted through a visual interface. This may be implemented, without limitation, as described above in reference to FIGS. 1-7. In some embodiments, the sensory device may include an optical device. In some embodiments, the sensory device may include an audio capture device. In some embodiments, the user data may include user metadata. This may be implemented, without limitation, as described above in reference to FIGS. 1-7.

With continued reference to FIG. 8, method 800 includes a step 810 of authenticating, by the at least a processor, the user as a function of the external datum using a user authentication module. This may be implemented, without limitation, as described above in reference to FIGS. 1-7. In some embodiments, the authentication module may include a computer vision model configured to process the external datum and determine an external user identifier pertaining to the user. In some embodiments, authenticating the user may include verifying the external datum using the computer vision model, generate an external verification datum as a function of the verification, and granting the user access to a virtual education environment as a function of the external verification datum, wherein the virtual environment comprises a plurality of virtual education elements. In some embodiments, authenticating the user may include generating a haptic feedback as a function of the external verification datum and transmitting the haptic feedback to the user. This may be implemented, without limitation, as described above in reference to FIGS. 1-7.

With continued reference to FIG. 8, method 800 includes a step 815 of generating, by the at least a processor, educational training data as a function of the user data. This may be implemented, without limitation, as described above in reference to FIGS. 1-7. In some embodiments, generating educational training data may include generating a user implication identifier as a function of the external datum and assigning the user implication identifier to the user data pertaining to the user. In some embodiments, generating the user implication identifier may include generating a user implication classifier and classifying the external user datum into the user implication identifier as a function of the user implication classifier. This may be implemented, without limitation, as described above in reference to FIGS. 1-7.

With continued reference to FIG. 8, method 800 includes a step 820 of training, by the at least a processor, an educational machine-learning model using the educational training data. This may be implemented, without limitation, as described above in reference to FIGS. 1-7.

With continued reference to FIG. 8, method 800 includes a step 825 of determining, by the at least a processor, a user input modifier as a function of the trained educational machine-learning model. This may be implemented, without limitation, as described above in reference to FIGS. 1-7.

With continued reference to FIG. 8, method 800 may include a step of applying, by the at least a processor, the user input modifier to the user input. This may be implemented, without limitation, as described above in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
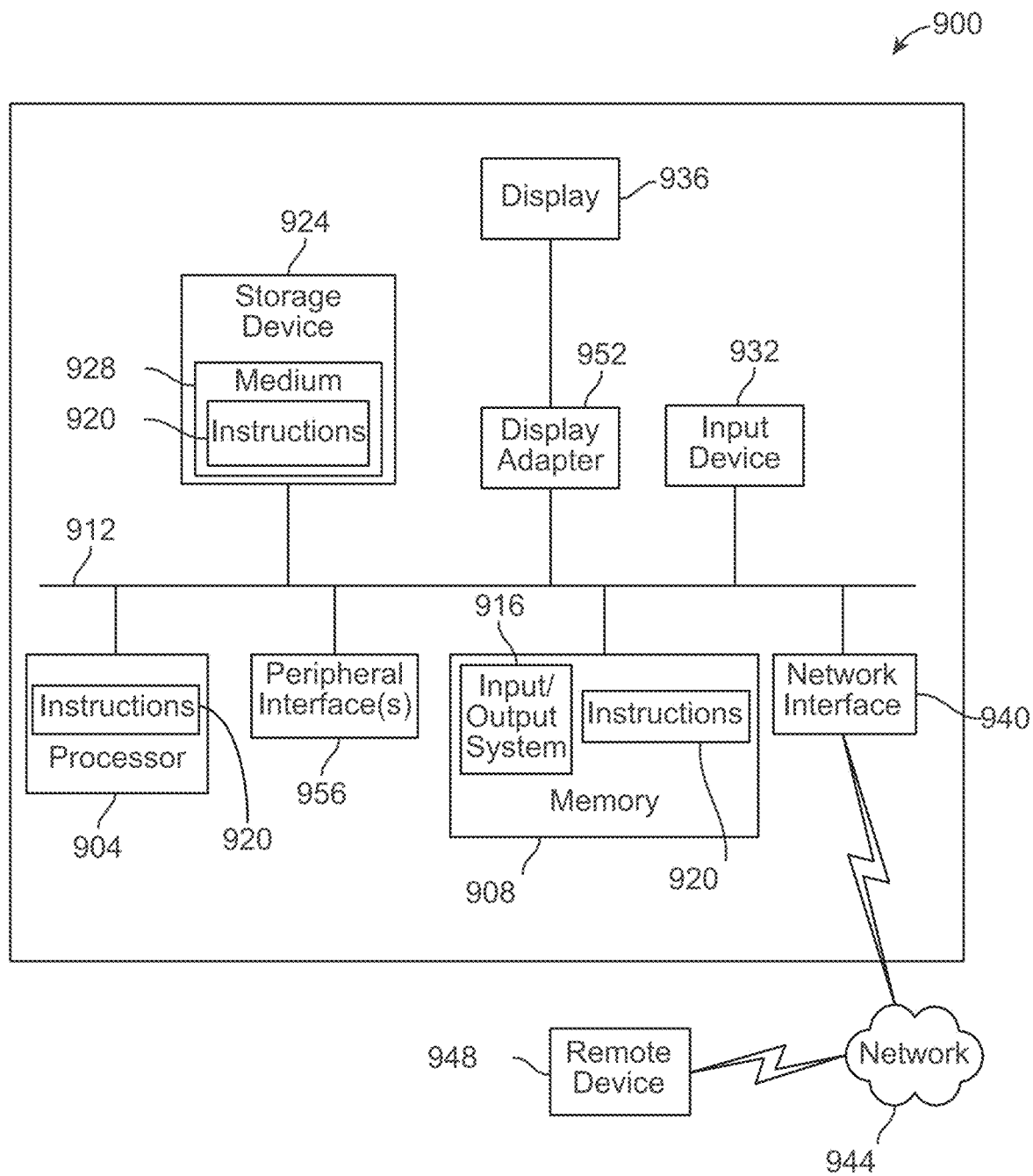
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for training an educational machine-learning model, the apparatus comprises:
   a sensory device configured to capture an external datum pertaining to a user;
   at least a processor in communication with the sensory device; and
   a memory communicatively connected to the at least a processor, wherein the memory contains instructions configuring the at least a processor to:
      receive user data comprising an external datum, wherein the external datum is captured by the sensory device;
      authenticate the user as a function of the external datum using a user authentication module;
      using a computer vision model, detect a user implication identifier based on the external datum;
      determine a user input modifier, wherein determining the user input modifier comprises:
         training an educational machine-learning model as a function of educational training data, wherein the educational training data comprises a plurality of user data and at least an implication pair, wherein the plurality of user data and the at least an implication pair are correlated to a user input modifier;
         and
         determining the user input modifier using the educational machine-learning model, the user implication identifier, and the
            user data and implication pair, wherein the user implication identifier indicates an emotion of the user.

2. The apparatus of claim 1, wherein the sensory device comprises an optical device.

3. The apparatus of claim 1, wherein the authentication module comprises a computer vision model configured to:
   process the external datum; and
   generate an external user identifier as a function of the external datum.

4. The apparatus of claim 3, wherein authenticating the user comprises:
   verifying the external datum using the computer vision model;
   generating an external verification datum as a function of the verification; and
   granting the user access to a virtual education environment as a function of the external verification datum, wherein the virtual education environment comprises a plurality of virtual education elements.

5. The apparatus of claim 4, wherein authenticating the user comprises denying the user access to the virtual education environment in response to receiving negative external verification datum.

6. The apparatus of claim 4, wherein authenticating the user comprises:
   generating a haptic feedback as a function of the external verification datum; and
   transmitting the haptic feedback to the user.

7. The apparatus of claim 6, wherein authenticating the user further comprises generating an additional haptic feedback in response to receiving a negative external verification datum, wherein the additional haptic feedback is distinct from the haptic feedback.

8. The apparatus of claim 1, wherein detecting the user implication identifier comprises:
   generating a user implication classifier; and
   classifying the external user datum into the user implication identifier as a function of the user implication classifier.

9. The apparatus of claim 1, wherein training the educational machine-learning model further comprises utilizing a plurality of user data and implication pairs as inputs correlated to a plurality of user input modifiers as outputs.

10. The apparatus of claim 1, wherein the memory contains instructions configuring the at least a processor to apply the user input modifier to the user input.

11. A method for training an educational machine-learning model, the method comprising:

receiving, by at least a processor, user data pertaining to a user, wherein the user data comprises:

an external datum, wherein the external datum is captured by a sensory device;

authenticating, using the at least a processor, the user as a function of the external datum using a user authentication module;

detecting, using a computer vision model, a user implication identifier based on the external datum;

determining, by at least the processor, a user input modifier, wherein determining the user input modifier comprises:

training an educational machine-learning model as a function of educational training data, wherein the educational training data comprises a plurality of user data and at least an implication pair, wherein the plurality of user data and the at least an implication pair are correlated to a user input modifier; and determining the user input modifier using the educational machine-learning model, the user implication identifier, and the user data and implication pair, wherein the user implication identifier indicates an emotion of the user.

12. The method of claim 11, wherein the sensory device comprises an optical device.

13. The method of claim 11, further comprising:

processing, using a computer vision model of the authentical module, the external datum; and generating, using the computer vision model, an external user identifier as a function of the external datum.

14. The method of claim 13, wherein authenticating the user comprises:

verifying the external datum using the computer vision model;

generating an external verification datum as a function of the verification; and granting the user access to a virtual education environment as a function of the external verification datum, wherein the virtual education environment comprises a plurality of virtual education elements.

15. The method of claim 14, further comprising denying the user access to the virtual education environment in response to receiving negative external verification datum.

16. The method of claim 14, wherein authenticating the user comprises:

generating a haptic feedback as a function of the external verification datum; and transmitting the haptic feedback to the user.

17. The method of claim 16, further comprising generating an additional haptic feedback in response to receiving a negative external verification datum, wherein the additional haptic feedback is distinct from the haptic feedback.

18. The method of claim 11, wherein detecting the user implication identifier comprises:

generating a user implication classifier; and classifying the external user datum into the user implication identifier as a function of the user implication classifier.

19. The method of claim 11, wherein training the educational machine-learning model further comprises utilizing a plurality of user data and implication pairs as inputs correlated to a plurality of user input modifiers as outputs.

20. The method of claim 11, further comprising applying the user input modifier to the user input.

* * * * *